(12) United States Patent
Koga et al.

(10) Patent No.: US 8,532,855 B2
(45) Date of Patent: Sep. 10, 2013

(54) HYBRID CONSTRUCTION MACHINE

(75) Inventors: Masato Koga, Kanagawa (JP); Hiroso Shono, Kanagawa (JP); Tadao Osuka, Chiba (JP); Takashi Kubo, Chiba (JP)

(73) Assignees: Sumitomo Heavy Industries, Ltd., Tokyo (JP); Sumitomo(S.H.I.) Construction Machinery Co., Ltd., Tokyo (JP)

( * ) Notice: Subject to any disclaimer, the term of this patent is extended or adjusted under 35 U.S.C. 154(b) by 322 days.

(21) Appl. No.: 13/000,032

(22) PCT Filed: Jun. 25, 2009

(86) PCT No.: PCT/JP2009/061611
§ 371 (c)(1),
(2), (4) Date: Dec. 20, 2010

(87) PCT Pub. No.: WO2009/157511
PCT Pub. Date: Dec. 30, 2009

(65) Prior Publication Data
US 2011/0098873 A1    Apr. 28, 2011

(30) Foreign Application Priority Data

Jun. 27, 2008  (JP) ................... 2008-169472
Sep. 8, 2008  (JP) ................... 2008-230000
Sep. 18, 2008  (JP) ................... 2008-239851

(51) Int. Cl.
*B60L 11/00*    (2006.01)
(52) U.S. Cl.
USPC ................. 701/22; 180/65.265; 903/930
(58) Field of Classification Search
USPC ............. 701/22, 50; 180/65.265, 65.26; 903/930
See application file for complete search history.

(56) References Cited

U.S. PATENT DOCUMENTS

| 7,076,947 | B2* | 7/2006 | Ariga et al. | 60/452 |
| 2002/0125052 | A1* | 9/2002 | Naruse et al. | 180/53.8 |
| 2004/0222000 | A1* | 11/2004 | Ohtsukasa | 172/2 |
| 2007/0096667 | A1* | 5/2007 | Komiyama et al. | 318/98 |
| 2007/0214782 | A1* | 9/2007 | Komiyama et al. | 60/431 |
| 2009/0036264 | A1* | 2/2009 | Tozawa et al. | 477/5 |
| 2009/0044528 | A1* | 2/2009 | Narazaki et al. | 60/452 |
| 2010/0031650 | A1* | 2/2010 | Morinaga et al. | 60/459 |
| 2010/0071973 | A1* | 3/2010 | Morinaga et al. | 180/65.265 |
| 2010/0097037 | A1* | 4/2010 | Morinaga et al. | 322/14 |
| 2010/0115800 | A1* | 5/2010 | Sakai et al. | 37/348 |

FOREIGN PATENT DOCUMENTS

| JP | 2004-100821 | 4/2004 |
| JP | 2005-009381 | 1/2005 |
| JP | 2005-163605 | 6/2005 |
| JP | 2006-233843 | 9/2006 |
| JP | 2006-336845 | 12/2006 |

* cited by examiner

*Primary Examiner* — Helal A Algahaim
(74) *Attorney, Agent, or Firm* — IPUSA, PLLC

(57) ABSTRACT

A hybrid construction machine includes an engine, a hydraulic pump configured to be driven by the engine, a hydraulic actuator configured to be driven with a hydraulic pressure from the hydraulic pump, an electric motor configured to assist the driving of the engine, and a generator configured to be driven by the engine to generate power. The number of revolutions of the engine is caused to vary in accordance with the size of a load on the engine. In response to a decrease in the load requested of the engine, the engine is decelerated by causing the generator to generate power. In response to an increase in the load requested of the engine, the engine is accelerated by assisting the engine by driving the electric motor.

15 Claims, 15 Drawing Sheets

FIG.14

| CONDITION | A1 | A2 | A3 | A4 | A5 | A6 | A7 |
|---|---|---|---|---|---|---|---|
| HYDRAULIC LOAD OUTPUT REQUEST | ○ | × | × | ○ | ○ | ○ | × |
| MOTOR LOAD OUTPUT REQUEST | × | ○ | × | ○ | ○ | × | ○ |
| BATTERY OUTPUT REQUEST | × | × | ○ | × | ○ | ○ | ○ |
| ASSIST OUTPUT | ASSIST | IDLING | IDLING | ASSIST | ASSIST | ASSIST | IDLING |
| BATTERY OUTPUT | ○ | ○ | × | ○ | ○ | ○ | ○ |
| ENGINE OUTPUT | × | × | × | × | × | × | × |

FIG.15

| CONDITION | B1 | B2 | B3 | B4 | B5 | B6 | B7 |
|---|---|---|---|---|---|---|---|
| HYDRAULIC LOAD OUTPUT REQUEST | ○ | × | × | ○ | ○ | ○ | × |
| MOTOR LOAD OUTPUT REQUEST | × | ○ | × | ○ | ○ | × | ○ |
| BATTERY OUTPUT REQUEST | × | × | ○ | × | ○ | ○ | ○ |
| ASSIST OUTPUT | IDLING | POWER GENERATION | POWER GENERATION | POWER GENERATION | POWER GENERATION | POWER GENERATION | POWER GENERATION |
| BATTERY OUTPUT | × | × | × | × | × | × | × |
| ENGINE OUTPUT | ○ | ○ | ○ | ○ | ○ | ○ | ○ |

HYBRID CONSTRUCTION MACHINE

TECHNICAL FIELD

The present invention relates to hybrid construction machines, and more particularly to a hybrid construction machine where the driving of an engine is assisted by an electric motor.

BACKGROUND ART

Many construction machines are hydraulically driven. Examples of hydraulically driven construction machines include hydraulic shovels. Generally, in hydraulic shovels, a shovel is driven, an upper-part turning body is caused to turn, and a lower-part traveling body is caused to travel using a hydraulic actuator (hydraulic cylinders and hydraulic motors). In general, a hydraulic pressure supplied to a hydraulic actuator is often generated by a hydraulic pump whose drive source is an engine. In this case, the output of the hydraulic actuator is determined by the output of the engine.

A full capacity of the engine is not always required and, for example, 90% or 80% of the capacity is often sufficient for the operations of hydraulic shovels. Therefore, the operation mode of the hydraulic shovel is changed according to work loads so as to optimize engine output control for each of different work loads, thereby efficiently driving the engine to improve fuel consumption.

For example, it is made possible to set different operation modes such as "a high load mode" for performing a load operation corresponding to the maximum output of the engine, "a normal load mode" for performing a normal-load operation, and "a low load mode" for performing a light-load operation. Then, iso-horsepower control is performed so as to equalize the drive torque required by the hydraulic pump to drive the hydraulic actuator with the output torque of the engine in each operation mode, thereby efficiently utilizing the output of the engine to improve fuel consumption.

In recent years, there is a demand for reduction in the amount of fuel consumed by the engine. Simple reduction in the size of the engine would result in insufficient hydraulic output at the time of driving in the "high load mode." Therefore, so-called hybrid hydraulic shovels have been developed that include an engine, a generator driven by the engine, a battery charged by the generator, and an electric motor driven with the electric power of the battery.

In common hybrid hydraulic shovels, the driving of the engine is controlled so that the number of revolutions of the engine is always constant. The torque of the engine is small during driving in the low load mode (low load state) for swinging an arm or a bucket. Therefore, in the low load mode, an extra torque is generated by increasing the torque of the engine while keeping the number of revolutions of the engine constant, and the generator is driven with the extra torque to generate electric power, thereby charging the battery.

On the other hand, in the high load mode (high load state) where the drive torque required by the hydraulic pump is greater than the rated output point of the engine, the torque of the engine is increased while the number of revolutions of the engine is kept constant, and the output of the electric motor is added (for assisting) to the output of the engine by driving the electric motor with the electric power from the battery.

Further, a construction machine is proposed that increases the torque of an engine to improve the rate of fuel consumption and drives a generator with a resulting extra torque to charge a battery at the time of a low load mode (at the time of a mode where the engine torque at the intersection point of the iso-horsepower line of the necessary horsepower and the governor characteristic line of the engine is smaller than the rated output of the engine). (For example, see Patent Document 1.)

According to such a circular engine fuel consumption rate characteristic as described above, the injection pressure is determined depending on the number of revolutions of the engine. Further, in the drive control of the engine, at the time of the low load mode, the fuel consumption rate, which is determined to be around the center of a circle where the number of revolutions at the time of the low load mode is best, is expected to improve slightly, but at the time of the high load mode, where the engine is driven in a region of high fuel consumption rates, no improvement is expected.

[Prior Art Document]
[Patent Document]
[Patent Document 1] Japanese Laid-Open Patent Application No. 2004-100621

DISCLOSURE OF THE INVENTION

Problems to be Solved by the Invention

As described above, at a high-load time when the request of a hydraulic load exceeds the upper limit value of the output of the engine, the shortage of the output of the engine is supplemented by generating power by assisting. In this case, since supplementation is made for the overload on the engine, an electrical energy loss at the time of the discharge of the battery, an electrical energy loss due to an inverter not graphically illustrated, a loss in the generator, and also a mechanical energy loss in gears are accumulated, so that the construction machine as a whole has a large energy loss.

The present invention is made in view of the above-described problem, and has an object of providing a hybrid construction machine capable of efficiently driving an engine by varying the number of revolutions of the engine depending on the state of a load on the engine so as to improve the rate of fuel consumption both at a low mode time and at a high load time.

Means for Solving the Problems

In order to achieve the above-described object, according to the present invention, a hybrid construction machine is provided that includes an engine; a hydraulic pump configured to be driven by the engine; a hydraulic actuator configured to be driven with a hydraulic pressure from the hydraulic pump; an electric motor configured to assist driving of the engine; and a generator configured to be driven by the engine to generate a power, wherein a number of revolutions of the engine is caused to vary in accordance with a size of a load on the engine, the engine is decelerated by causing the generator to generate the power, in response to a decrease in the load requested of the engine, and the engine is accelerated by assisting the engine by driving the electric motor, in response to an increase in the load requested of the engine.

In the above-described hybrid construction machine, it is preferable that one of the generator and the electric motor be driven until the number of revolutions of the engine reaches one of a predetermined low number of revolutions and a predetermined high number of revolutions, and that an output of the one of the generator and the electric motor for the deceleration or the acceleration be stopped after the number of revolutions of the engine reaches the one of the predetermined low number of revolutions and the predetermined high number of revolutions. Further, it is preferable to determine that the load requested by the hydraulic pump is prevented from exceeding a maximum rated output of the engine. Alternatively, it may be determined that a total of an electrical load and a hydraulic load is prevented from exceeding a maximum rated output of the engine.

Further, in the above-described hybrid construction machine, a reference torque line may be determined based on a low fuel consumption region in an iso-fuel consumption map of the engine, and an operating condition of the engine may be controlled so that the number of revolutions of the engine changes in correspondence to the reference torque line. The reference torque line may be so determined as to cause a fuel consumption rate to be a good value.

Further, in the above-described hybrid construction machine, such a reference torque line as to cause a fuel consumption rate to be a predetermined good value may be determined in an iso-fuel consumption map of the engine, and an operating condition of the engine may be controlled so that the number of revolutions of the engine changes along the reference torque line. The number of revolutions of the engine may be variably controlled in response to a torque requested of the engine going outside a predetermined torque range having a center on the reference torque line.

Further, a single motor generator may be used for the electric motor and the generator.

In addition, the above-described hybrid construction machine may further include a charge storage device configured to supply electric power to the electric motor and to supply the electric power to an electrical load, so that the hydraulic pump may be driven with an output of the electric motor as a primary power if a total output obtained by totaling an output to be supplied to the hydraulic actuator and an output to be supplied to the electrical load is less than or equal to a predetermined threshold, and the hydraulic pump may be driven with an output of the engine as the primary power if the total output is more than the predetermined threshold.

Further, the hydraulic pump may be driven using only the output of the electric motor as power if the total output obtained by totaling the output to be supplied to the hydraulic actuator and the output to be supplied to the electrical load is less than or equal to the predetermined threshold.

Further, the hydraulic pump may be driven using only the output of the engine as power if the total output obtained by totaling the output to be supplied to the hydraulic actuator and the output to be supplied to the electrical load is more than the predetermined threshold.

Further, the predetermined threshold may be set based on a predetermined characteristic of the engine. A characteristic expressed by a relationship between the number of revolutions of the engine and a torque of the engine may be used as the predetermined characteristic. Further, the charge storage device may be configured to supply the electric power to the electrical load if the total output is composed only of the output to be supplied to the electrical load and is less than or equal to the predetermined threshold. Further, the charge storage device may be configured to supply the electric power to the electric motor so that the hydraulic pump is driven only with the output of the electric motor if the total output is composed only of the output to be supplied to the hydraulic actuator and is less than or equal to the predetermined threshold.

Effects of the Invention

According to one embodiment of the present invention, in an engine having a fuel consumption rate map where the fuel consumption rate is low both at the time of low numbers of revolutions and at the time of high numbers of revolutions, such as a common-rail type engine, it is possible to drive the engine efficiently by changing the number of revolutions of the engine depending on the load conditions of the engine and improve the fuel consumption rate both at a low load time and at a high load time.

Further, according to another embodiment of the present invention, a hydraulic pump may be driven using the output of the engine by driving the engine at the high load time when the fuel consumption rate is good and using only the output of a motor generator without using the output of the engine at the low load time. Accordingly, it is possible to drive the engine with a high load with which the fuel consumption rate is good and to suppress fuel consumption with fuel being supplied to the engine for the only purpose of maintaining the number of revolutions at the low load time when the fuel consumption rate is poor. This makes it possible to improve the fuel consumption rate of the engine without a substantial change in the existing engine control.

BRIEF DESCRIPTION OF THE DRAWINGS

FIG. 14 is a table illustrating the statuses of the output of a motor generator, the output of a battery, and the output of the engine in the case where the total output request is less than or equal to the threshold.

FIG. 15 is a table illustrating the statuses of the output of the motor generator, the output of the battery, and the output of the engine in the case where the total output request is more than the threshold.

BEST MODE FOR CARRYING OUT THE INVENTION

Next, a description is given, with reference to the drawings, of embodiments of the present invention.

First, a description is given of a hybrid hydraulic shovel as an example of a hybrid construction machine to which the present invention is applied.

Figure 1:
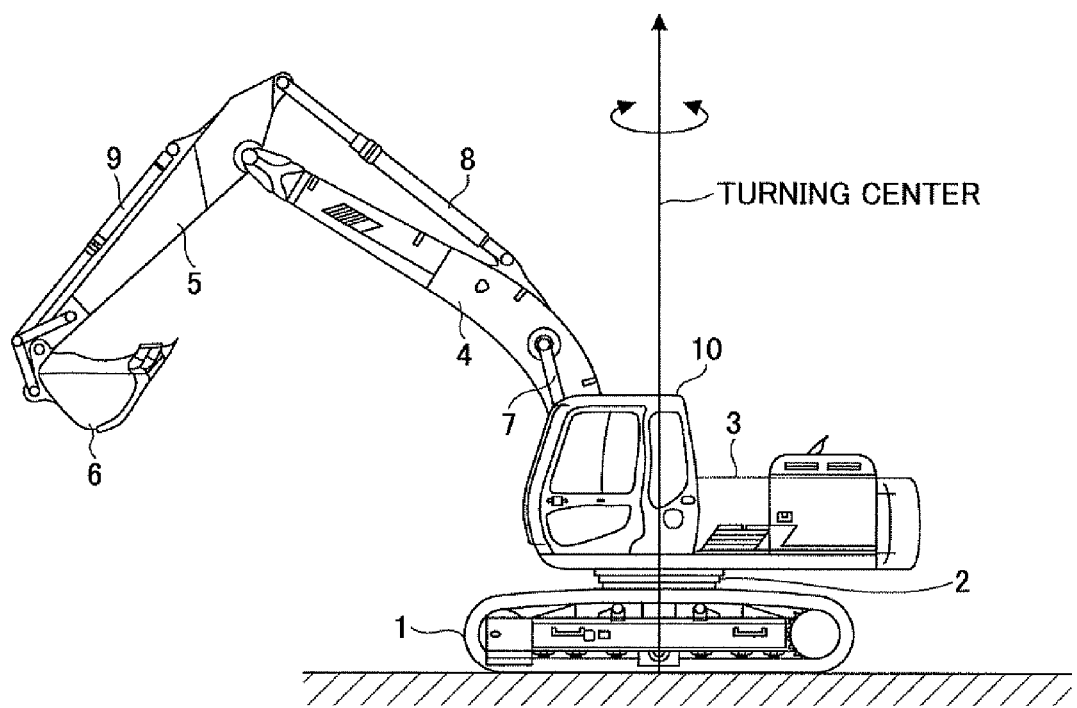
FIG. 1 is a side view of a hybrid hydraulic shovel.

FIG. 1 is a side view of a hybrid hydraulic shovel. An upper-part turning body 3 is mounted through a turning mechanism 2 on a lower-part traveling body 1 of the hybrid hydraulic shovel. A boom 4 extends from the upper-part turning body 3. An arm 5 is connected to the end of the boom 4. Further, a bucket 6 is connected to the end of the arm 5. The boom 4, the arm 5, and the bucket 6 are hydraulically driven by a boom cylinder 7, an arm cylinder 8, and a bucket cylinder 9, respectively. Further, a cabin 10 and power sources (not graphically illustrated) are mounted on the upper-part turning body 3.

Figure 2:
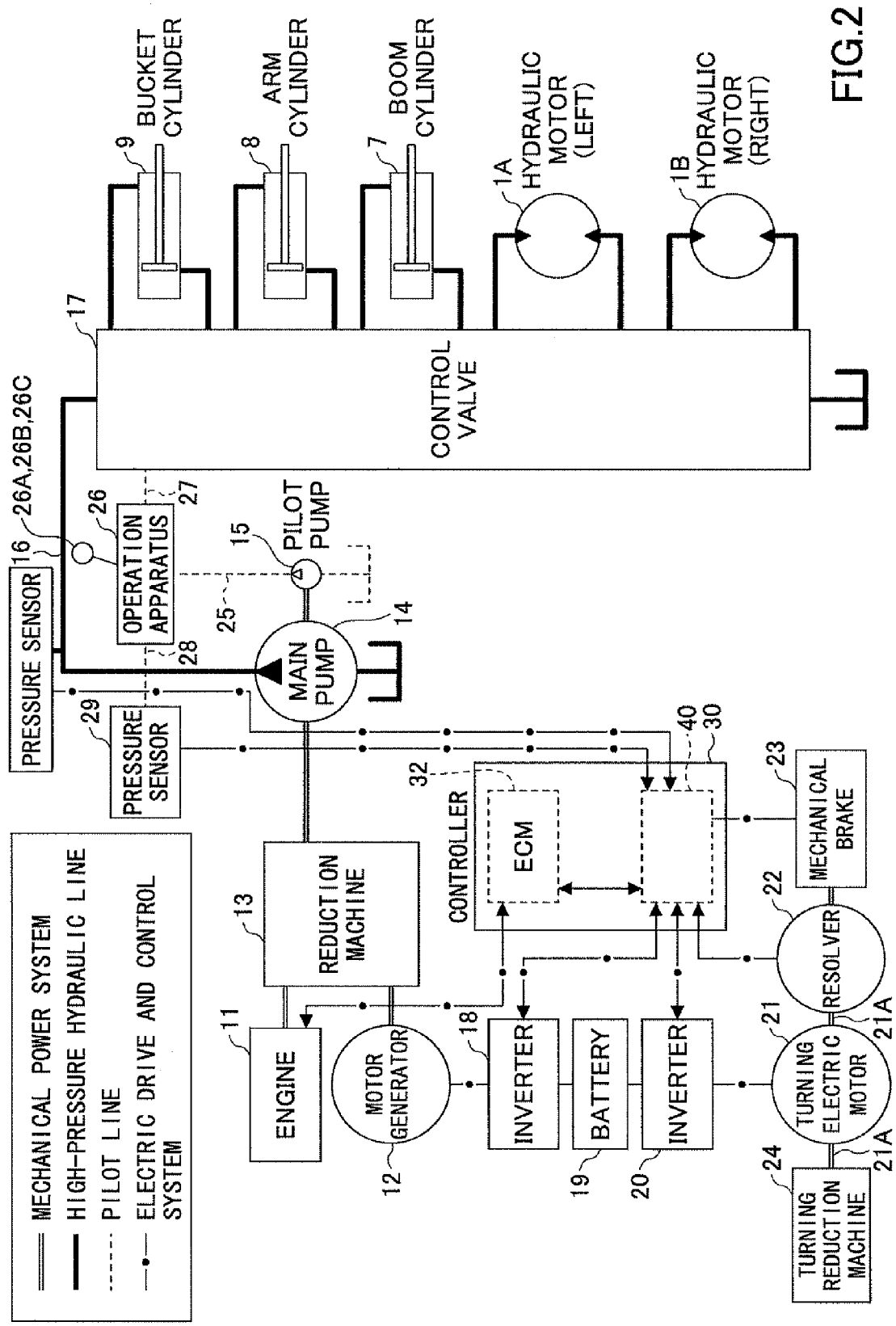
FIG. 2 is a block diagram illustrating a configuration of a drive system of the hybrid hydraulic shovel illustrated in FIG. 1.

FIG. 2 is a block diagram illustrating a configuration of the drive system of the hybrid hydraulic shovel illustrated in FIG. 1. In FIG. 2, a double line, a solid line, a broken line, and a one-dot-chain line indicate a mechanical power system, a high-pressure hydraulic line, a pilot line, and an electric drive and control system, respectively.

An engine 11 as a mechanical drive part and a motor generator 12 as an assist drive part are both connected to the input shafts of a reduction machine 13 as a power-up machine. A main pump 14 and a pilot pump 15 are connected to the output shaft of the reduction machine 13. A control valve 17 is connected to the main pump 14 via a high-pressure hydraulic line 16. Here, the engine 11 and the motor generator 12 may be directly connected without using the reduction machine 13.

The control valve 17 is a control unit that controls a hydraulic system. Hydraulic motors 1A (for the right) and 1B (for the left) for the lower-part traveling body 1, the boom cylinder 7, the arm cylinder 8, and the bucket cylinder 9 are connected to the control valve 17 via high-pressure hydraulic lines.

A battery 19 as a charge storage device is connected to the motor generator 12 via an inverter 18. A turning motor generator 21 is connected to the battery 19 via an inverter 20. The turning motor generator 21 is an electrical load in the hybrid hydraulic shovel. A resolver 22, a mechanical brake 23, and a turning reduction machine 24 are connected to a rotation shaft 21A of the turning electric motor 21. An operation apparatus 26 is connected to the pilot pump 15 via a pilot line 25. The control valve 17 and a pressure sensor 29 as a lever operation detecting part are connected to the operation apparatus 26 via hydraulic lines 27 and 28, respectively. The pressure sensor 29 is connected to a controller 30 that controls the driving of an electric system.

The hybrid hydraulic shovel having the above-described configuration is a hybrid construction machine that uses the engine 11, the motor generator 12, and the turning electric motor 21 as power sources. These power sources are mounted on the upper-part turning body 3 illustrated in FIG. 1. A description is given below of each part.

The engine 11, which is, for example, an internal combustion engine constituted of a diesel engine, has its output shaft connected to one of the input shafts of the reduction machine 13. The engine 11 is operated constantly during the operation of the construction machine.

The motor generator 12 may be an electric motor capable of performing both a power running operation and a generator operation. Here, a motor generator driven by the inverter 18 is illustrated as the motor generator 12. This motor generator 12 may be constituted of, for example, an IPM (Interior Permanent Magnetic) motor having magnets embedded in a rotor. The rotation shaft of the motor generator 12 is connected to the other one of the input shafts of the reduction machine 13. In this embodiment, the motor generator capable of performing both a power running operation and a generator operation is used. Alternatively, an electric motor that performs a power running operation and a generator that performs a generator operation may be connected to the engine 11 via a reduction machine. Further, the motor generator 12 may alternatively be connected directly to the engine 11.

The reduction machine 13 has two input shafts and one output shaft. The two input shafts are connected to the drive shaft of the engine 11 and the drive shaft of the motor generator 12, respectively. Further, the output shaft is connected to the drive shaft of the main pump 14. The power running operation and the generator operation of the motor generator 12 are switched by the controller 30 in accordance with a load on the engine 11. The main pump 14 may alternatively be connected directly to the motor generator 12.

The main pump 14 is a hydraulic pump that generates a hydraulic pressure to be supplied to the control valve 17. The hydraulic pressure generated in the main pump 14 is supplied via the control valve 17 in order to drive the hydraulic motors 1A and 1B, the boom cylinder 7, the arm cylinder 8, and the bucket cylinder 9, which are hydraulic loads. The pilot pump 15 is a pump that generates a pilot pressure necessary for a hydraulic operation system.

The control valve 17 is a hydraulic pressure control unit that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling a hydraulic pressure to be supplied to each of them in accordance with an input of an operation by an operator.

The inverter 18, which is provided between the motor generator 12 and the battery 19 as described above, controls the operation of the motor generator 12 based on commands from the controller 30. Thereby, when controlling the electric motor operation of the motor generator 12, the inverter 18 supplies necessary electric power to the motor generator 12 from the battery 19. On the other hand, when controlling the generator operation of the motor generator 12, the inverter 18 charges the battery 19 with the electric power generated by the motor generator 12.

The battery 19, which is a charge storage device, is provided between the inverter 18 and the inverter 20. Thereby, the battery 19 serves as a power supply for supplying necessary electric power for a power running operation when at least one of the motor generator 12 and the turning electric motor 21 is performing the power running operation and for storing the electric power regenerated by a generator operation or a regenerative operation as electric energy when at least one of the motor generator 12 and the turning electric motor 21 is performing the generator operation or the regenerative operation. A capacitor (an electric double layer capacitor) may be used as the battery 19. However, the battery 19 is not limited to a capacitor, and may be any battery as long as the battery may be charged and discharged repeatedly.

The inverter 20, which is provided between the turning electric motor 21 and the battery 19 as described above, controls the operation of the turning electric motor 21 based on commands from the controller 30. Thereby, during the power running operation of the turning electric motor 21, necessary electric power is supplied from the battery 19 to the turning electric motor 21. Further, during the regenerative operation of the turning electric motor 21, the battery 19 is charged with the electric power generated by the turning electric motor 21. Here, in FIG. 2, an electric motor is used as the turning electric motor 21. However, the electric motor may also be used for other purposes than turning. Further, multiple electric motors may be connected to the battery 19 and be controlled. Further, DC-DC converters for stabilizing the voltage of the battery 19 may be provided between the inverters 18 and 20 and the battery 19.

The turning electric motor 21, which may be an electric motor capable of both a power running operation and a regenerative operation, is provided in order to drive the turning mechanism 2 of the upper-part turning body 3. At the time of a power running operation, the rotating force of the rotational drive power of the turning electric motor 21 is amplified by the reduction machine 24, and the upper-part turning body 3 makes a rotational movement while being subjected to an acceleration or deceleration control. Further, the number of revolutions is increased in the reduction machine 24 by the inertial rotation of the upper-part turning body 3 to be transmitted to the turning electric motor 21, thereby making it possible to regenerate electric power. Here, an electric motor AC-driven by the inverter 20 based on a PWM (Pulse Width Modulation) control signal is illustrated as the turning electric motor 21. This turning electric motor 21 may be constituted of, for example, an IPM motor of a magnet embedded type.

The operation apparatus 26, which is an input device for an operator of the hybrid hydraulic shovel to operate the turning electric motor 21, the lower-part traveling body 1, the boom 4, the arm 5, and the bucket 6, includes levers 26A and 26B and pedals 26C. The lever 26A, which is a lever for operating the turning electric motor 21 and the arm 5, is provided near the driver's seat of the upper-part turning body 3. The lever 26B, which is a lever for operating the boom 4 and the bucket 6, is provided near the driver's seat. The pedals 260, which are a pair of pedals for operating the lower-part traveling body 1, are provided at the foot of the driver's seat.

The operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the levers 26A and 26B and the pedal 260 are operated respectively, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thereby, the lower-part traveling body 1, the boom 4, the arm 5, and the bucket 6 are driven.

The hydraulic line 27, which is actually composed of eight hydraulic lines in total: two each for operating the hydraulic motors 1A and 1B (that is, four in total) and two each for operating the boom cylinder 7, the arm cylinder 8, and the bucket cylinder 9 (that is, six in total), is illustrated as a single hydraulic line for convenience of description.

In the pressure sensor 29 as a lever operation detecting part, a change in the hydraulic pressure inside the hydraulic line 28 due to the turning operation of the lever 26A is detected. The pressure sensor 29 outputs an electrical signal representing the hydraulic pressure inside the hydraulic line 28. This electrical signal is input to the controller 30. This makes it possible to determine the amount of turning operation of the lever 26A with accuracy. Further, while a pressure sensor is used as a lever operation detecting part in this embodiment, a sensor may alternatively be used that reads the amount of turning operation of the lever 26A directly as an electrical signal.

The controller 30, which is a control unit that controls the driving of the hybrid hydraulic shovel, includes an engine control part 32 and a drive control unit 40. The engine control part 32 sets a target number of revolutions at the time of engine operation and controls the amount of fuel injection for maintaining the number of revolutions.

The drive control unit 40 controls the outputs of the turning electric motor 21, the motor generator 12, and the main pump 14 based on signals from the pressure sensor 29, the inverters 18 and 20, and the resolver 22. Further, the drive control unit 40 controls a load due to the main pump 14 and an electrical load.

Next, a description is given of drive control of a hybrid construction machine according to a first embodiment of the present invention, taking drive control of the above-described hybrid hydraulic shovel as an example.

Figure 3:
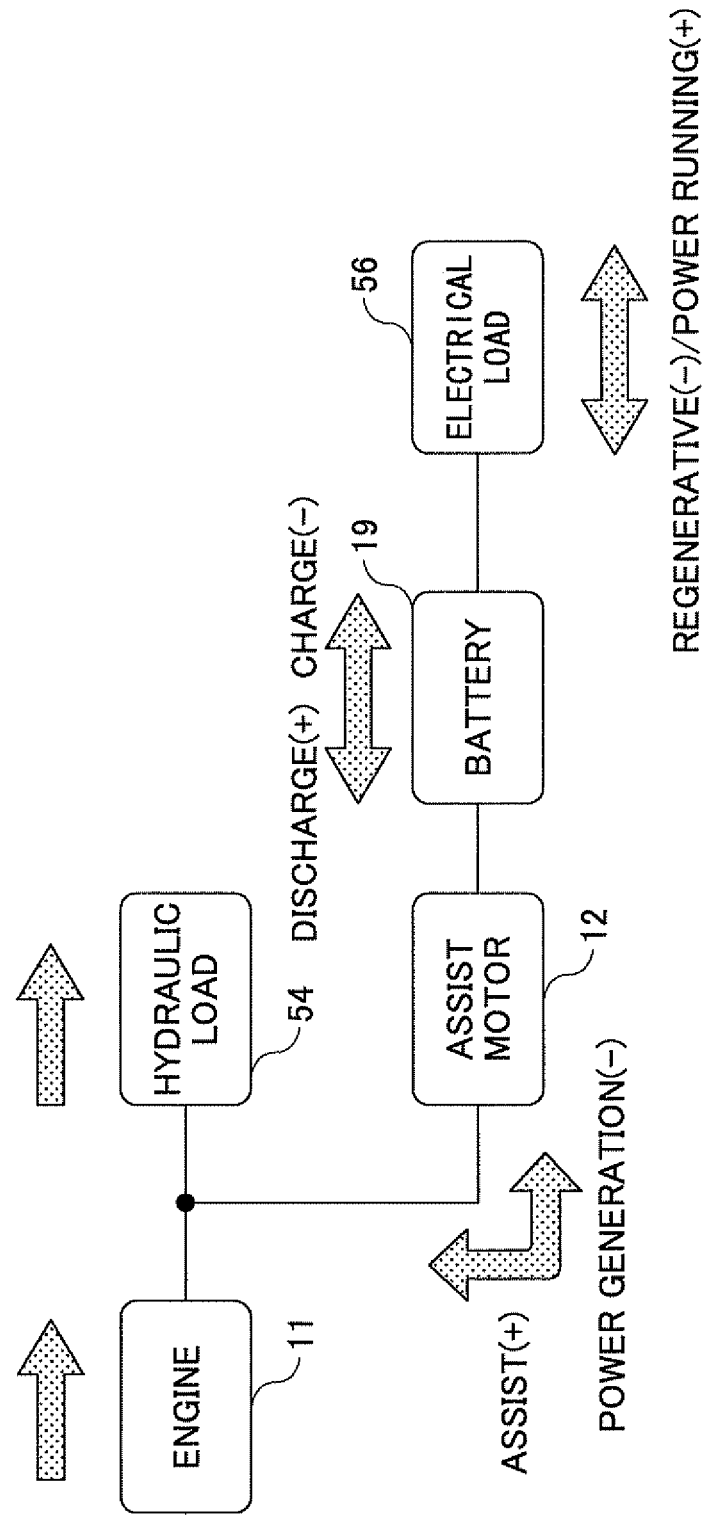
FIG. 3 is a diagram illustrating a modeled power system of the hybrid hydraulic shovel illustrated in FIG. 1.

FIG. 3 is a diagram illustrating a modeled power system of the above-described hybrid hydraulic shovel. In the model diagram of FIG. 3, a hydraulic load 54, which corresponds to components driven with a hydraulic pressure, includes the above-described boom cylinder 7, arm cylinder 8, packet cylinder 9, and hydraulic motors 1A and 1B. When considered as a load for causing a hydraulic pressure to be generated, however, the hydraulic load 54 corresponds to the main pump 14 as a hydraulic pump that causes a hydraulic pressure to be generated. An electrical load 56, which corresponds to components driven with electric power, such as an electric motor and an electric actuator, includes the above-described turning electric motor 21. In this embodiment, a capacitor (an electric double layer capacitor) is used as the battery 19.

Here, the engine 11 is an engine having such an injection performable region as to allow the injection pressure to be a uniform high injection pressure throughout the entire region from low numbers of revolutions to high numbers of revolutions. By causing the injection pressure to be also as high at a time of a low number of revolutions as at a time of a high number of revolutions in such an injection performable region, a fuel consumption characteristic may be obtained that makes it possible to keep the rate of fuel consumption low in a high torque region along a limit torque line M in a revolution number region from low numbers of revolutions to high numbers of revolutions. Here, the limit torque line M is a maximum torque indicating performance achievable by the engine 11.

The hydraulic load 54 is supplied with the hydraulic pressure generated in the hydraulic pump that generates a hydraulic pressure (the above-described main pump 14). The engine 11 supplies power to this hydraulic pump 14 and drives it. That is, the power generated by the engine 11 is converted into a hydraulic pressure by the hydraulic pump to be supplied to the hydraulic load 54.

The electrical load 56 is supplied with electric power from the battery 19 to be driven. The case where the electrical load 56 is being driven is referred to as a power running operation. The electrical load 56 can regenerate electric power as an electric motor and generator, for example. The regenerated electric power is supplied to and stored in the battery 19 or is supplied to the assist motor 12 to serve as electric power for driving the assist motor 12.

The battery 19 is charged with regenerated electric power from the electrical load 56 as described above. Further, when the assist motor 12 receives power from the engine 11 and functions as a generator, it is also possible to supply and charge the battery 19 with the electric power generated by the assist motor 12.

According to the engine drive control of the first embodiment of the present invention, the number of revolutions of the engine 11 is caused to vary in accordance with the size of a load on the engine 11. In reducing the number of revolutions of the engine 11 at a low load time, the engine 11 is decelerated by causing the motor generator 12 (assist motor) to perform a generator operation to generate power. That is, a torque necessary for the deceleration at the time of reducing the number of revolutions of the engine 11 at a low load time is generated by causing the motor generator 12 to perform a generator operation. On the other hand, in increasing the number of revolutions of the engine 11 at a high load time, the engine 11 is accelerated by causing the motor generator 12 to perform a power running operation to assist the engine 11. That is, a torque necessary for the acceleration at the time of increasing the number of revolutions of the engine 11 at a high load time is generated by causing the motor generator 12 to perform a power running operation.

Figure 4:
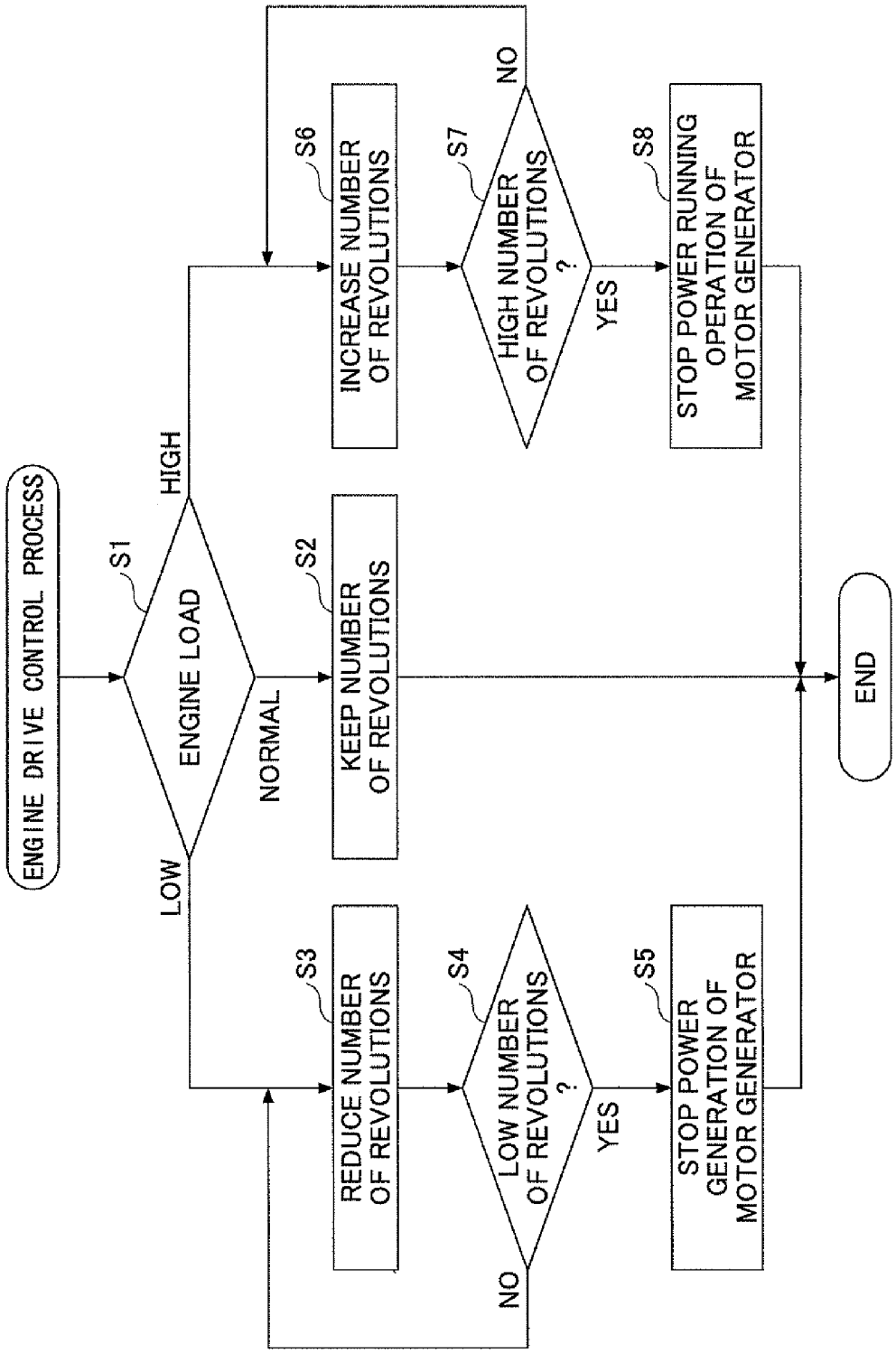
FIG. 4 is a flowchart of an engine drive control process according to a first embodiment.

FIG. 4 is a flowchart of an engine drive control process according to the first embodiment of the present invention.

First, the state of a load relative to a current number of revolutions of the engine 11 is calculated, and in step S1, it is determined whether the load applied is high or low. Specifically, the time of idling, the time of the regenerative operation of the turning drive part, and the time of a boom lowering operation correspond to the case of the low load. Further, the load is high when multiple drive parts are simultaneously loaded, and the case where a load is applied on a single drive part is determined as an intermediate load.

The criterion for determining whether the load is normal (intermediate), low, or high may be determined as desired in advance based on the design particulars of the hybrid hydraulic shovel. The criterion may be changed as needed in accordance with the operating conditions or working environment of the hybrid hydraulic shovel.

If the load of the engine 11 is determined as the normal load in step S1, the process proceeds to step S2, and the number of revolutions of the engine 11 is kept as is. In this embodiment, the engine 11 is controlled so that the number of revolutions of the engine 11 is maintained at a predetermined normal number of revolutions in the case of the normal load. The output torque of the engine 11 is controlled so that this normal number of revolutions is kept constant even if the load on the engine 11 varies within the range of the normal load.

If the load of the engine 11 is determined as the low load in step S1, the process proceeds to step S3. In step S3, the driving of the engine 11 is controlled so as to reduce the number of revolutions of the engine 11. Here, the output of the engine 11 is determined by the number of revolutions and the torque of the engine 11. Accordingly, it is possible to reduce the output of the engine 11 and reduce the load on the engine 11 by reducing the number of revolutions of the engine 11. Therefore, in this embodiment, the number of revolutions is reduced by causing the motor generator 12 to perform a generator operation, using the output torque of the engine 11 for power generation. The electric power generated by the generator operation of the motor generator 12 is supplied to the battery 19 and used to charge the battery 19, but may also be supplied to other electrical loads such as the turning electric motor 21 and consumed.

Next, in step S4, it is determined whether the number of revolutions of the engine 11 is reduced to a predetermined low number of revolutions. If it is determined that the rotation of the engine 11 is not reduced to the predetermined number of revolutions, the process returns to step S3 to continue processing for reducing the number of revolutions of the engine 11. This predetermined low number of revolutions may be set to any value based on the characteristics of the engine 11. The predetermined low number of revolutions may be a preset fixed number of revolutions or may be changed as needed in accordance with the operating conditions or working environment of the hybrid hydraulic shovel. The predetermined low number of revolutions may be such a number of revolutions as to allow the engine 11 to be operated under conditions of a high fuel consumption rate.

If it is determined in step S4 that the number of revolutions of the engine 11 is reduced to the predetermined low number of revolutions, the process proceeds to step S5, and the generator operation of the motor generator 12 is stopped. By the above-described control process, the number of revolutions of the engine 11 may be reduced to a predetermined low number of revolutions while keeping the same engine output (low output state).

On the other hand, if it is determined in step S1 that the load of the engine 11 is high, the process proceeds to step S6. In step S6, the driving of the engine 11 is controlled so as to increase the number of revolutions of the engine 11. Here, the output of the engine 11 is determined by the number of revolutions and the torque of the engine 11. Accordingly, it is possible to increase the output of the engine 11 and increase the load on the engine 11 by increasing the number of revolutions of the engine 11. Therefore, in this embodiment, the number of revolutions of the engine 11 is increased by causing the motor generator 12 to perform a power running operation to assist the engine 11. Electric power necessary for the power running operation of the motor generator 12 is supplied from the battery 19. Alternatively, regenerated electric power from other electrical loads such as the turning electric motor 21 may also be used.

Next, in step S7, it is determined whether the number of revolutions of the engine 11 is increased to a predetermined high number of revolutions. If it is determined that the number of revolutions of the engine 11 is not increased to the predetermined high number of revolutions, the process returns to step S6 to continue processing for increasing the number of revolutions of the engine 11. This predetermined high number of revolutions may be set to any value based on the characteristics of the engine 11. The predetermined high number of revolutions may be a preset fixed number of revolutions or may be changed as needed in accordance with the operating conditions or working environment of the hybrid hydraulic shovel. The predetermined high number of revolutions may be such a number of revolutions as to allow the engine 11 to be operated under conditions of a high fuel consumption rate.

If it is determined in step S7 that the number of revolutions of the engine 11 is increased to the predetermined high number of revolutions, the process proceeds to step S8, and the power running operation of the motor generator 12 is stopped. By the above-described control process, the number of revolutions of the engine 11 may be increased to a predetermined high number of revolutions while keeping the same engine output (high output state).

Figure 5:
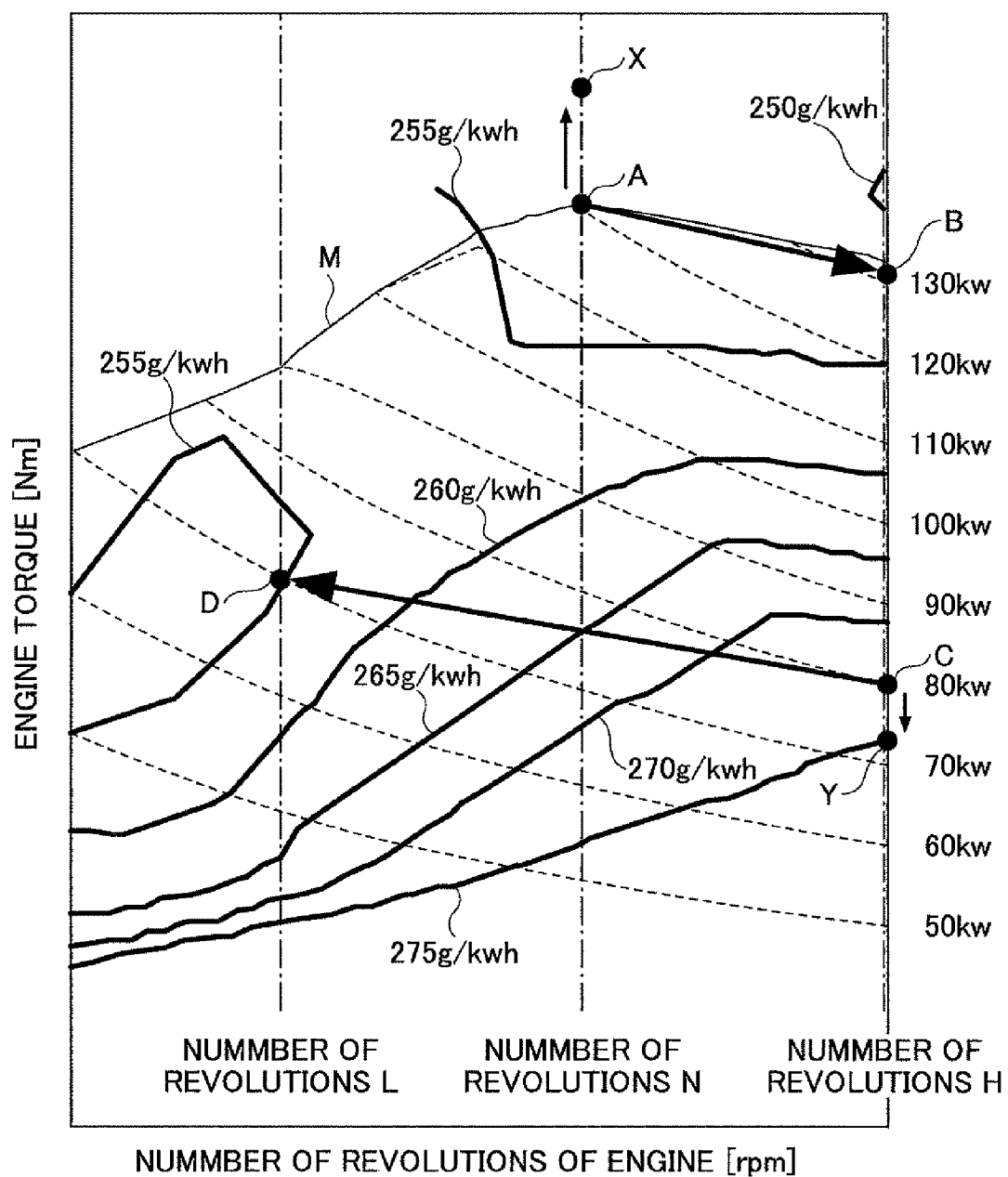
FIG. 5 is an iso-fuel consumption map illustrating the condition of an engine at the time of executing the engine drive control process according to the first embodiment.

A further description is given, with reference to the iso-fuel consumption map of FIG. 5, of the above-described engine drive control process.

In the iso-fuel consumption map of FIG. 5, the number of revolutions of the engine 11 maintained at the normal load time is indicated as Number of Revolutions N. Further, the predetermined high number of revolutions at the high load time is indicated as Number of Revolutions H, and the predetermined low number of revolutions at the low load time is indicated as Number of Revolutions L. The vertical axis of the iso-fuel consumption map of FIG. 5 represents engine torque, and iso-output lines are indicated by dotted lines. Iso-fuel consumption lines are indicated by bold solid lines. Further, a maximum torque line indicating performance achievable by the engine 11 is indicated by M.

Here, the iso-fuel consumption map of FIG. 5 is a diagram indicating a fuel consumption characteristic that makes it possible to keep the rate of fuel consumption low in a high torque region along the limit torque line M in a revolution number region from low numbers of revolutions to high numbers of revolutions. FIG. 5 illustrates a zonal fuel consumption characteristic unaffected by the number of revolutions.

In the process of increasing the number of revolutions of the engine 11 at the high load time (steps S6 through S8) in the above-described engine drive control process, for example, an increase in the number of revolutions and a decrease in engine torque at the time of a shift from the normal load to the high load are shown by a shift from Point A to Point B. The operating state of the engine 11 at Point A is that, for example, there is a sudden increase in a hydraulic load to increase a load on the engine 11 while the engine 11 is in operation at a normal Number of Revolutions N, so that the normal output range is considerably exceeded. At this point, in the case of keeping the number of revolutions of the engine 11 constant (Number of Revolutions N), in response to a request exceeding the upper limit of the output of the engine 11, the motor generator 12 assists for the shortage of the output of the engine 11 so as to maintain the output state of Point X (130 kW). In this case, however, the fuel consumption rate of the engine 11 deteriorates. Further, continuation of the request for high output results in a shortage of battery power anyway. Therefore, in this embodiment, keeping the number of revolutions of the engine 11 constant is canceled, and the number of revolutions of the engine 11 is increased up to a Number of Revolutions H with the assistance of the motor generator 12. That is, a torque for accelerating the engine 11 is supplied by causing the motor generator 12 (assist motor) to perform a power running operation. This process is the above-described process of steps S6 through S8.

In response to the number of revolutions of the engine 11 becoming Number of Revolutions H, the control for keeping the number of revolutions constant is resumed to keep the number of revolutions constant (Number of Revolutions H). The output of the engine 11 is expressed by the product of the torque and the number of revolutions of the engine 11. Therefore, at Point B, the torque of the engine 11 is reduced for an increase in the number of revolutions compared with Point A. As a result, the operating conditions of the engine 11 shift from Point A (120 kW) to Point B (130 kW) so as to improve the fuel consumption rate while increasing output.

On the other hand, in the process of reducing the number of revolutions of the engine 11 at the low load time (steps S3 through S5) in the above-described engine drive control process, for example, a decrease in the number of revolutions and an increase in engine torque at the time of a shift from the high load to the low load are shown by a shift from Point C to Point D. The operating state of the engine 11 at Point C is that, for example, there is a sudden decrease in a hydraulic load to reduce a load on the engine 11 while the engine 11 is in operation at the high Number of Revolutions H for the high load time. At this point, in the case of keeping the number of revolutions of the engine 11 constant (Number of Revolutions H), the output condition at Point Y (73 kW) is maintained by causing the motor generator 12 to perform a generator operation to consume the excess output of the engine 11. In this case, however, the consumption efficiency of the engine 11 deteriorates in spite of reduced output. Therefore, in this embodiment, keeping the number of revolutions of the engine 11 constant is canceled, and the number of revolutions of the engine 11 is reduced to a Number of Revolutions L while causing the motor generator 12 to perform a generator operation. That is, a torque for decelerating the engine 11 is absorbed by causing the motor generator 12 (assist motor) to perform a generator operation. This process is the above-described process of steps S3 through S5.

In response to the number of revolutions of the engine 11 becoming the Number of Revolutions L, the control for keeping the number of revolutions constant is resumed to keep the number of revolutions constant (Number of Revolutions L). The output of the engine 11 is expressed by the product of the torque and the number of revolutions of the engine 11. Therefore, at Point D, the output of the engine 11 is reduced for a decrease in the number of revolutions compared with Point C. As a result, the fuel consumption rate of the engine 11 shift from Point C (80 kW) to Point D (70 kW) so as to improve the fuel consumption rate while decreasing output.

As described above, in the above-described embodiment, the number of revolutions of the engine 11 is caused to vary in accordance with the size of a load on the engine 11. At the time of reducing the number of revolutions of the engine 11 when the load becomes low, the engine 11 is decelerated by causing the motor generator 12 to perform a generator operation to generate electric power. On the other hand, at the time of increasing the number of revolutions of the engine 11 when the load becomes high, the engine 11 is accelerated by causing the motor generator 12 to perform a power running operation to assist the engine 11. As a result, it is possible to improve the fuel consumption rate of the engine 11 both at the low load time and at the high load time. Further, since a maximum hydraulic load is so set as to not exceed a limit torque line, no hydraulic load exceeding the output of the engine 11 is applied, so that there is no need to make supplementation for an excess load with the motor generator 12. Therefore, it is possible to meet a request by a hydraulic load by simply transmitting power from the engine 11 to the main pump 14 (hydraulic pump). Further, the motor generator 12 may perform an assist operation for only an increase to be caused in the number of revolutions of the engine 11. Accordingly, it is possible to reduce electrical energy loss at the time of the motor generator 12 performing an assist operation and mechanical energy loss in gears.

Further, responsiveness and engine output at the time of switching the number of revolutions of the engine 11 between low rotation and high rotation are stabilized. Further, when a high load is applied, it is possible to stably increase the number of revolutions of the engine 11 by assisting for the amount of acceleration, and it is possible to reduce the size of and space for the battery 19 for driving the motor generator 12 with an output for the load mainly from the engine 11.

Next, a description is given of drive control of a hybrid construction machine according to a second embodiment of the present invention, taking drive control of the above-described hybrid hydraulic shovel as an example.

In the engine drive control according to the second embodiment of the present invention, like in the above-describe first embodiment, the number of revolutions of the engine 11 is caused to vary in accordance with the size of a load on the engine 11. Likewise, with respect to the iso-fuel consumption characteristic, a fuel consumption characteristic is given that makes it possible to keep the rate of fuel consumption low in a high torque region along the limit torque line M. In reducing the number of revolutions of the engine 11 at a low load time, the engine 11 is decelerated by causing the motor generator 12 (assist motor) to perform a generator operation to generate power. That is, a torque necessary for the deceleration at the time of reducing the number of revolutions of the engine 11 at a low load time is generated by causing the motor generator 12 to perform a generator operation. On the other hand, in increasing the number of revolutions of the engine 11 at a high load time, the engine 11 is accelerated by causing the motor generator 12 to perform a power running operation to assist the engine 11. That is, a torque necessary for the acceleration at the time of increasing the number of revolutions of the engine 11 at a high load time is generated by causing the motor generator 12 to perform a power running operation.

In engine drive control according to the second embodiment of the present invention, the variation range of the number of revolutions of the engine 11 is determined, and the number of revolutions of the engine 11 is set to an appropriate number of revolutions as needed within the variation range. The variation range is the range between a predetermined lower limit value and a predetermined upper limit value. Within the variation range, the number of revolutions of the engine 11 is set to a value along a reference torque line. The reference torque line is a line connecting numbers of revolutions of the engine 11 that make the fuel consumption rate of the engine 11 as good as possible at the time of generating the same torque in an iso-fuel consumption map.

Figure 6:
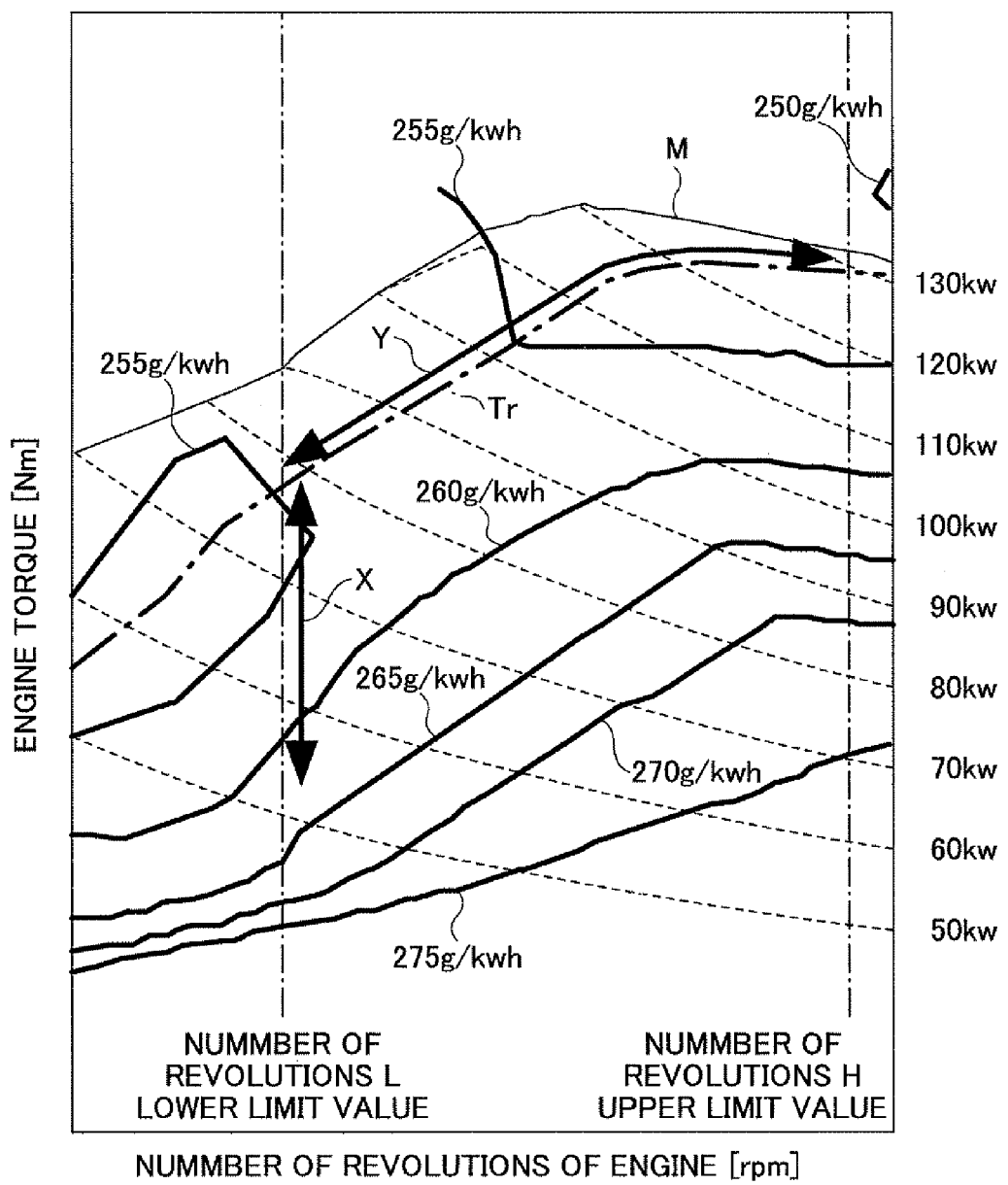
FIG. 6 is an iso-fuel consumption map illustrating the condition of the engine at the time of executing an engine drive control process according to a second embodiment.
Figure 7:
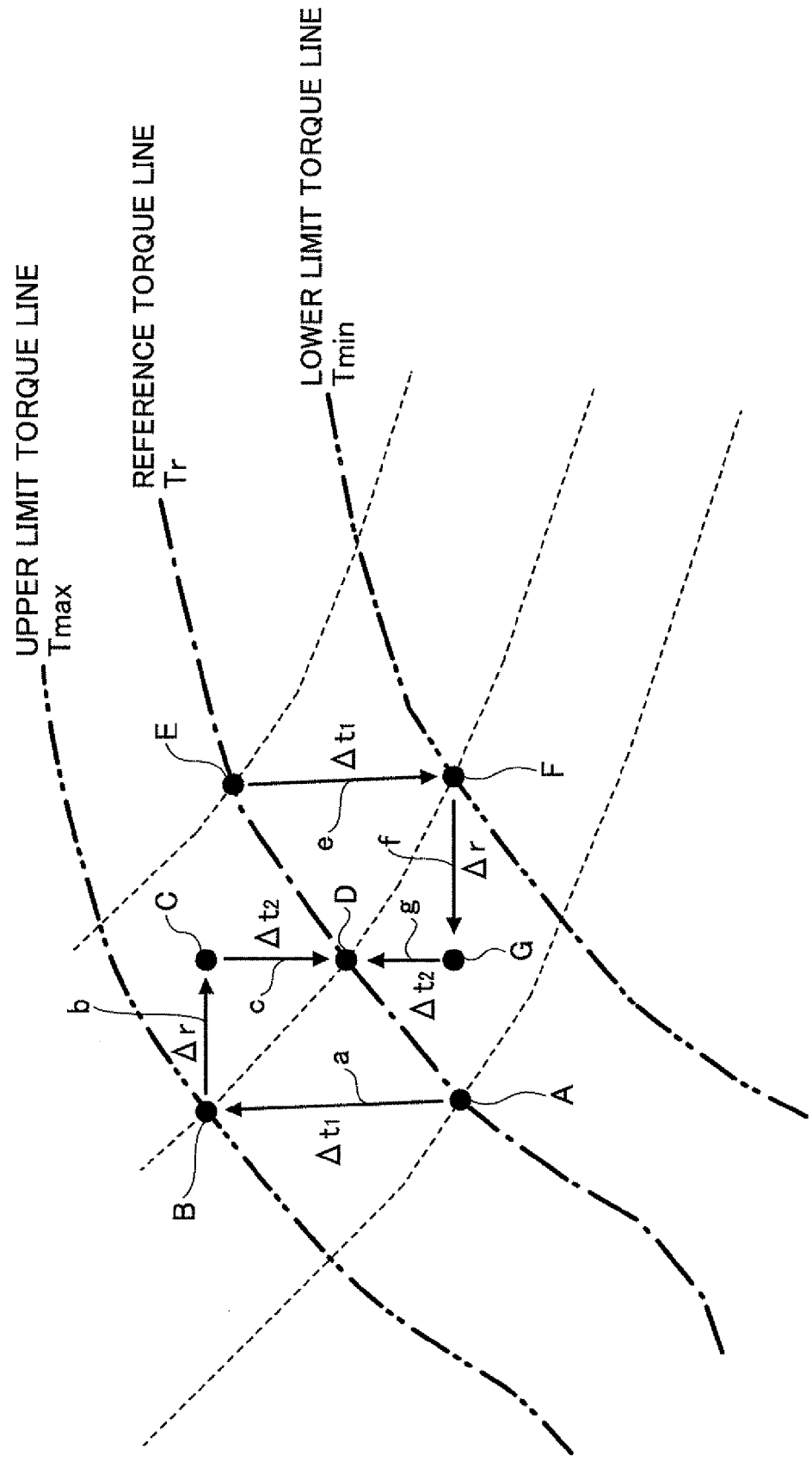
FIG. 7 is a diagram for illustrating a control process at the time of causing the number of revolutions to change along a reference torque line.

Here, a description is given, with reference to FIG. 6 and FIG. 7, of the reference torque line. In the iso-fuel consumption map of FIG. 6, the lower limit value of the number of revolutions of the engine 11 is indicated as the Number of Revolutions L, and the upper limit value of the number of revolutions of the engine 11 is indicated as the Number of Revolutions H. The number of revolutions of the engine 11 is controlled so as to be an appropriate value between the Number of Revolutions L and the Number of Revolutions H. The vertical axis of the iso-fuel consumption map of FIG. 6 represents engine torque, and iso-output lines are indicated by dotted lines. Iso-fuel consumption lines are indicated by bold solid lines. Further, a reference torque line Tr is indicated by a bold one-dot-chain line.

In the iso-fuel consumption map of FIG. 6, the reference torque line Tr is defined as a continuous line connecting points where the fuel consumption rate is as good as possible in a region where the torque is nearly maximized. In other words, the reference torque line Tr is a line connecting points where a good fuel consumption rate is obtained in a region where the torque at the instantaneous number of revolutions is nearly maximized when the number of revolutions changes, and is set based on a low fuel consumption region.

When the torque of the engine 11 is small, that is, when the engine 11 outputs a torque smaller than the reference torque line Tr in the iso-fuel consumption map of FIG. 6, the number of revolutions is set to the Number of Revolutions L, which is a lower limit value, and the number of revolutions is kept constant (Number of Revolutions L) even if there is an increase in the torque to be output by the engine 11. That is, the operating condition of the engine 11 changes along arrow X of FIG. 6. If the torque to be output by the engine 11 increases to go beyond the reference torque line Tr, the operation of the engine 11 is controlled with the number of revolutions made variable. Specifically, the operation of the engine 11 is controlled so that the number of revolutions changes in the directions of arrow Y along the reference torque line Tr.

FIG. 7 is a diagram for illustrating a control process at the time of causing the number of revolutions to change along the reference torque line Tr, showing part of the iso-fuel consumption map of FIG. 6. An upper limit torque line Tmax and a lower limit torque line Tmin are set on the greater torque side and on the smaller torque side, respectively, of the reference torque line Tr as a center. It may be determined that in the region above the upper limit torque line Tmax, the load on the engine 11 is high, and in the region below the lower limit torque line Tmin, the load on the engine 11 is low. If the engine 11 operating at the number of revolutions and torque on the reference torque line Tr (the state of Point A in FIG. 7) is requested to output a greater torque (if there is an increase in the load on the engine 11), first, the engine 11 is controlled so as to increase output torque while keeping the number of revolutions at that point. At this point, the operating condition of the engine 11 changes in a direction to increase torque with the number of revolutions remaining constant in the iso-fuel consumption map in FIG. 7. That is, the operating condition changes upward in the direction of arrow a from Point A in FIG. 7.

When the torque increases with the number of revolutions remaining constant so that the torque increases by $\Delta t1$ to reach the upper limit torque line Tmax (to enter the state of Point B in FIG. 7), such control is performed as to increase the number of revolutions that has been kept constant. At this point, the number of revolutions is increased by a predetermined number of revolutions $\Delta r$. This increase in the number of revolutions is indicated by arrow b in FIG. 7. The increase in the number of revolutions at this point is caused by causing the motor generator 12 (assist motor) to perform the number of revolutions $\Delta r$'s worth of a power running operation to assist the engine 11.

When the number of revolutions of the engine 11 is increased by $\Delta r$, there is an accompanying increase in output, so that the operating condition of the engine 11 shifts to Point C. Here, the torque currently requested of the engine 11 is the torque at Point B. By causing the number of revolutions to be that at Point C, such control is performed as to reduce the torque at Point C to equalize output with that at Point B. That is, the torque applied on the engine 11 may be reduced from the state of Point C by $\Delta t2$ as indicated by arrow c. As a result of this control, the operating state of the engine 11 changes from Point C to Point D. Point B and Point D are points of the same output, and Point D is a point to which Point B has moved along an iso-output line. Accordingly, Point D is the intersection point of the iso-output line passing through Point B and the reference torque line Tr.

If the output at Point B (that is, Point D) is a requested output, the number of revolutions of the engine 11 is maintained at the number of revolutions increased by $\Delta r$ from the number of revolutions at Point A, that is, the number of revolutions at Point D. If a greater torque is requested, the same control as the above-described control from Point A to Point D is performed on the operating condition, starting from Point D, so that the number of revolutions of the engine 11 is controlled to be a higher number of revolutions.

As described above, in the case of increasing output torque in response to application of a high load on the engine 11, the increase $\Delta r$ in the number of revolutions of the engine 11 corresponding to the torque deviation $\Delta t$ from the reference torque line Tr is determined, and the target number of revolutions of the engine 11 is updated to a current number of revolutions R plus $\Delta r$, that is, a value (R+$\Delta r$). Then, a power running operation command is given to the motor generator 12 (assist motor) so that the number of revolutions of the engine 11 becomes the updated target number of revolutions (R+$\Delta r$). As a result, it is possible to achieve fuel consumption rates along the reference torque line Tr while increasing output by increasing the number of revolutions of the engine 11.

If the load of the engine 11 is reduced, control reverse to the above-described control may be performed. That is, when the load of the engine 11 is reduced from a high load, first, the torque is reduced while keeping a current number of revolutions, and when the torque is reduced by $\Delta t1$ to reach the lower limit torque line Tmin (to enter the state of Point F in FIG. 7), such control is performed as to reduce the number of revolutions that has been kept constant. At this point, the number of revolutions is reduced by a predetermined number of revolutions Δr. This reduction in the number of revolutions is indicated by arrow f in FIG. 7. The reduction in the number of revolutions at this point is caused by applying a load on the engine 11 by causing the motor generator 12 (assist motor) to perform the number of revolutions Δr's worth of a power generator operation.

When the number of revolutions of the engine 11 is reduced by Δr, there is an accompanying decrease in output, so that the operating condition of the engine 11 shifts to Point G. Here, the output currently requested of the engine 11 is the output at Point F, so that the torque at Point G is too small. Therefore, the engine 11 is controlled so as to increase torque while keeping the number of revolutions at Point G so that the output is equalized with that at Point F. That is, the engine 11 is controlled so as to increase torque from the state of Point G by Δt2 as indicated by arrow g. As a result of this control, the operating state of the engine 11 changes from Point G to Point D. Point F and Point D are points of the same output, and Point D is a point to which Point F has moved along an iso-output line. Accordingly, Point D is the intersection point of the iso-output line passing through Point F and the reference torque line Tr.

If the torque at Point F (that is, Point D) is a requested torque, the number of revolutions of the engine 11 is maintained at the number of revolutions reduced by Δr from the number of revolutions at Point F, that is, the number of revolutions at Point D. If a smaller torque is requested, the same control as the above-described control from Point E to Point D is performed on the operating condition, starting from Point D, so that the number of revolutions of the engine 11 is controlled to be a lower number of revolutions.

As described above, in the case of reducing output torque in response to a decrease in the load on the engine 11, the reduction Δr in the number of revolutions of the engine 11 corresponding to the torque deviation Δt from the reference torque line Tr is determined, and the target number of revolutions of the engine 11 is updated to a current number of revolutions R minus Δr, that is, a value (R−Δr). Then, a generator operation command is given to the motor generator 12 (assist motor) so that the number of revolutions of the engine 11 becomes the updated target number of revolutions (R−Δr). As a result, it is possible to achieve fuel consumption rates along the reference torque line Tr while decreasing torque by decreasing the number of revolutions of the engine 11. Further, since a maximum hydraulic load is so set as to not exceed the limit torque line M, no hydraulic load exceeding the output of the engine 11 is applied, so that there is no need to make supplementation for an excess load with the motor generator 12. Therefore, it is possible to meet a request by a hydraulic load by simply transmitting power from the engine 11 to the main pump 14 (hydraulic pump). Further, the motor generator 12 may perform an assist operation for only an increase to be caused in the number of revolutions of the engine 11. Accordingly, it is possible to reduce electrical energy loss at the time of the motor generator 12 performing an assist operation and mechanical energy loss in gears.

Figure 8:
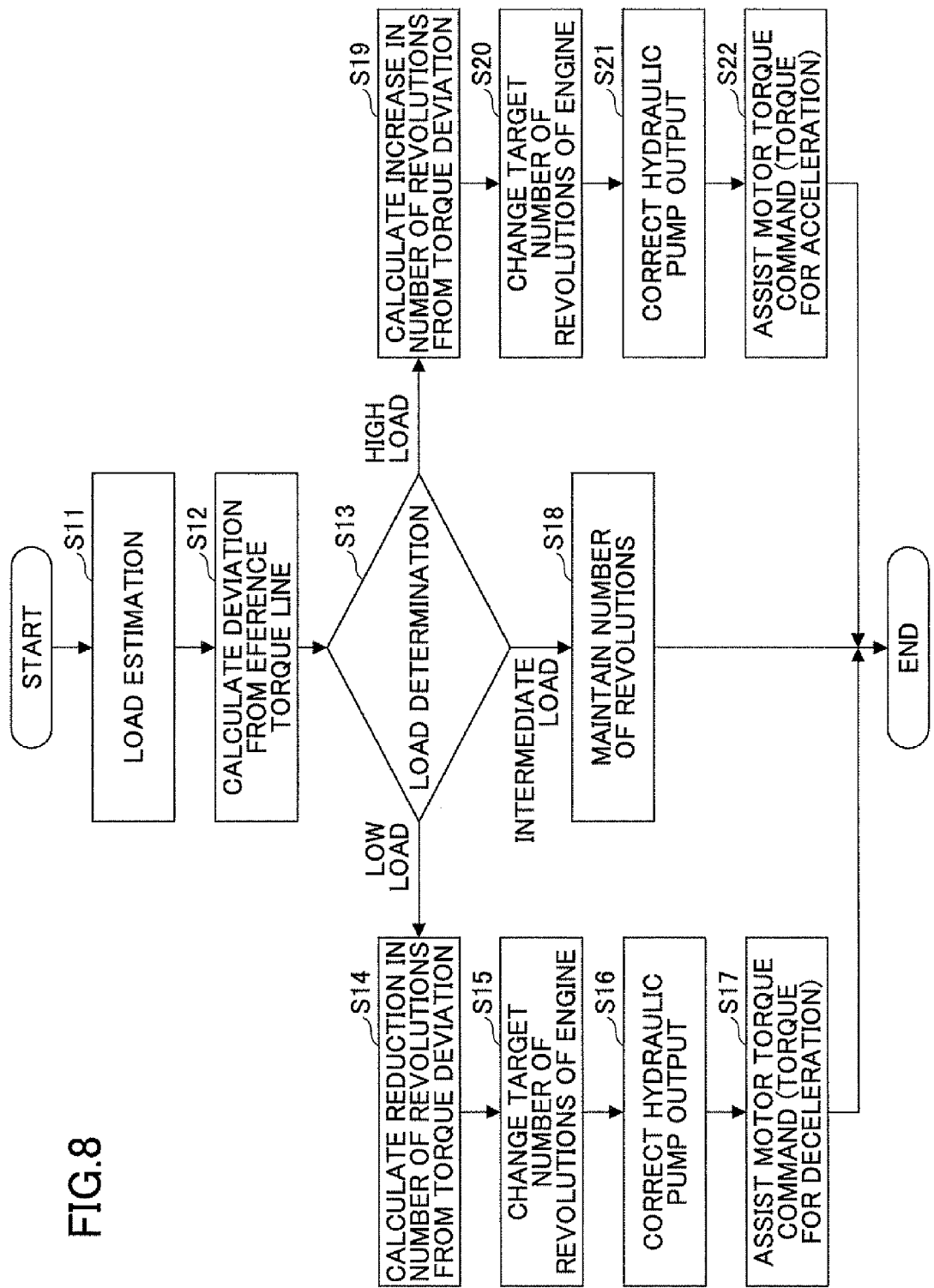
FIG. 8 is a flowchart of the engine drive control process according to the second embodiment.

FIG. 8 is a flowchart of an engine drive control process according to the second embodiment of the present invention.

First, in step S11, a requested load is calculated, and the torque to be output at the current number of revolutions of the engine 11 is determined. Next, in step S12, a deviation Δt between a torque at the current number of revolutions of the engine 11 and the torque to be output is calculated. Here, the current output torque is a torque on the reference torque line Tr.

Next, the process proceeds to step S13, and it is determined whether the load calculated in step S11 is a low load, an intermediate load, or a high load. The low load refers to the case where the Δt calculated in step S12 is equal to or greater than the difference between the reference torque line Tr and the lower limit torque line Tmin. The intermediate load refers to the case where the Δt calculated in step S12 is smaller than the difference between the reference torque line Tr and the lower limit torque line Tmin or smaller than the difference between the reference torque lint Tr and the upper limit torque line Tmax. The high load refers to the case where the Δt calculated in step S12 is equal to or greater than the difference between the reference torque line Tr and the upper limit torque line Tmax.

If it is determined in step S13 that the load is low, the process proceeds to step S14. In step S14, reduction Δr to be caused in the number of revolutions of the engine 11 is determined based on the torque deviation Δt. Then, in step S15, the target number of revolutions of the engine 11 is changed to a current number of revolutions R minus the number of revolutions Δr, that is, a value (R−Δr). Next, in step S16, the output of the main pump 14 (hydraulic pump) is corrected. That is, the output of the main pump 14 is corrected for a decrease to be caused in the output of the main pump 14 in order to reduce the number of revolutions, and the pump horsepower is set so that the output of the main pump 14 is constant. Next, in step S17, an assist motor torque command for causing the motor generator 12 (assist motor) to perform a generator operation is output to the motor generator 12, and the process ends. The motor generator 12 (assist motor) performs a generator operation based on this assist motor torque command to load the engine 11. Thereby, the number of revolutions of the engine 11 becomes the target value (R−Δr).

If it is determined in step S13 that the load is intermediate, the process proceeds to step S18. In step S18, such control is performed as to maintain the number of revolutions of the engine 11 at a current number of revolutions. That is, since a change in the torque is within the torque deviation Δt, the output torque is reduced or increased while keeping the number of revolutions constant.

On the other hand, if it is determined in step S13 that the load is high, the process proceeds to step S19. In step S19, an increase Δr to be caused in the number of revolutions of the engine 11 is determined based on the torque deviation Δt. Then, in step S20, the target number of revolutions of the engine 11 is changed to a current number of revolutions R plus the number of revolutions Δr, that is, a value (R+Δr). Next, in step S21, the output of the main pump 14 (hydraulic pump) is corrected. That is, the output of the main pump 14 is corrected for an increase to be caused in the output of the main pump 14 in order to increase the number of revolutions, and the pump horsepower is set so that the output of the main pump 14 is constant. Next, in step S22, an assist motor torque command for causing the motor generator 12 (assist motor) to perform a power running operation is output to the motor generator 12, and the process ends. The motor generator 12 (assist motor) performs a power running operation based on this assist motor torque command to assist the engine 11. Thereby, the number of revolutions of the engine 11 becomes the target value (R+Δr).

As described above, according to this embodiment, the engine 11 may be operated under conditions that cause the fuel consumption rate to be as high as possible while having the number of revolutions of the engine 11 controlled to any number of revolutions along the reference torque line Tr within a predetermined range. Further, when the torque goes outside the predetermined range with a center on the reference torque line Tr, the number of revolutions is variably controlled so as to allow the engine 11 to be operated under conditions that cause the fuel consumption rate to be as high as possible.

Next, a description is given of drive control of a hybrid construction machine according to a third embodiment of the present invention, taking drive control of the above-described hybrid hydraulic shovel as an example.

The engine drive control according to the third embodiment of the present invention is the same as the above-described drive control according to the second embodiment when, the load on the engine 11 is intermediate and high, but is different therefrom in that the engine 11 is driven only with the output of the motor generator 12 when the load on the engine 11 is extremely small. A description is given below of the drive control of a hybrid construction machine according to the third embodiment, focusing on differences from the above-described drive control of a hybrid construction machine according to the second embodiment.

Figure 9:
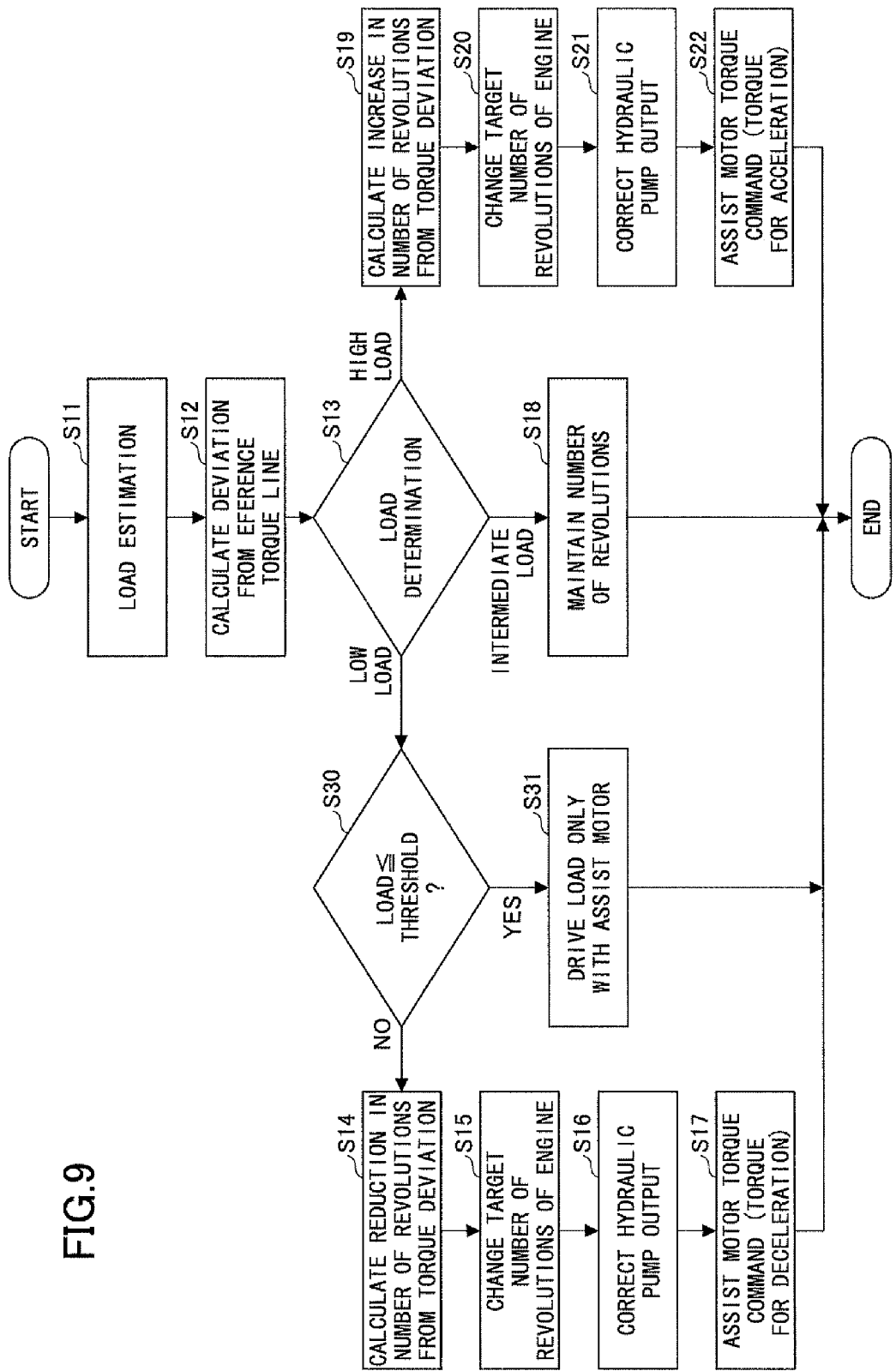
FIG. 9 is a flowchart of an engine drive control process according to a third embodiment.

FIG. 9 is a flowchart of an engine drive control process according to the third embodiment of the present invention. In FIG. 9, the same steps as the steps illustrated in FIG. 6 are given the same step numbers, and a description thereof is omitted as is thought fit.

In FIG. 9, the process from load estimation to load determination is the same as that of steps S11 through S13 of FIG. 8. Then, if it is determined in step 513 that the load is intermediate, the process proceeds to step S18, and such control is performed as to maintain the number of revolutions of the engine 11 at a current number of revolutions. Further, if it is determined in step S13 that the load is high, the process of step S19 through step S22 is performed, and an assist motor torque command (a torque command for the amount of acceleration) for causing the motor generator 12 (assist motor) to perform a power running operation is output to the motor generator 12. The above-described process is the same as in the drive control according to the second embodiment illustrated in FIG. 8.

On the other hand, if it is determined in step 513 that the load is low, the process proceeds to step S30 in this embodiment. In step S30, it is determined whether the load on the engine 11 is less than or equal to a predetermined threshold. The load on the engine 11 is a load that is the total of a hydraulic load output request and an electrical load output request, and is also referred to as "total output request" in the following description.

If the total load is greater than the predetermined threshold (that is, if the total load is not less than or equal to the predetermined threshold), the process proceeds to step S14, and the process of step S14 through step S17 illustrated in FIG. 8 is performed. On the other hand, if it is determined in step S30 that the total output request is less than or equal to the predetermined threshold, the process proceeds to step S31.

In step S31, such control is performed as to meet the total output request only with the output of the motor generator 12 (assist motor). That is, if it is determined in step S30 that the total output request is less than or equal to the predetermined threshold, the output of the engine 11 is not used and only the output of the motor generator 12 (that is, only the output of the battery 19) is used because the total output request is extremely small (an extremely low load).

Figure 10:
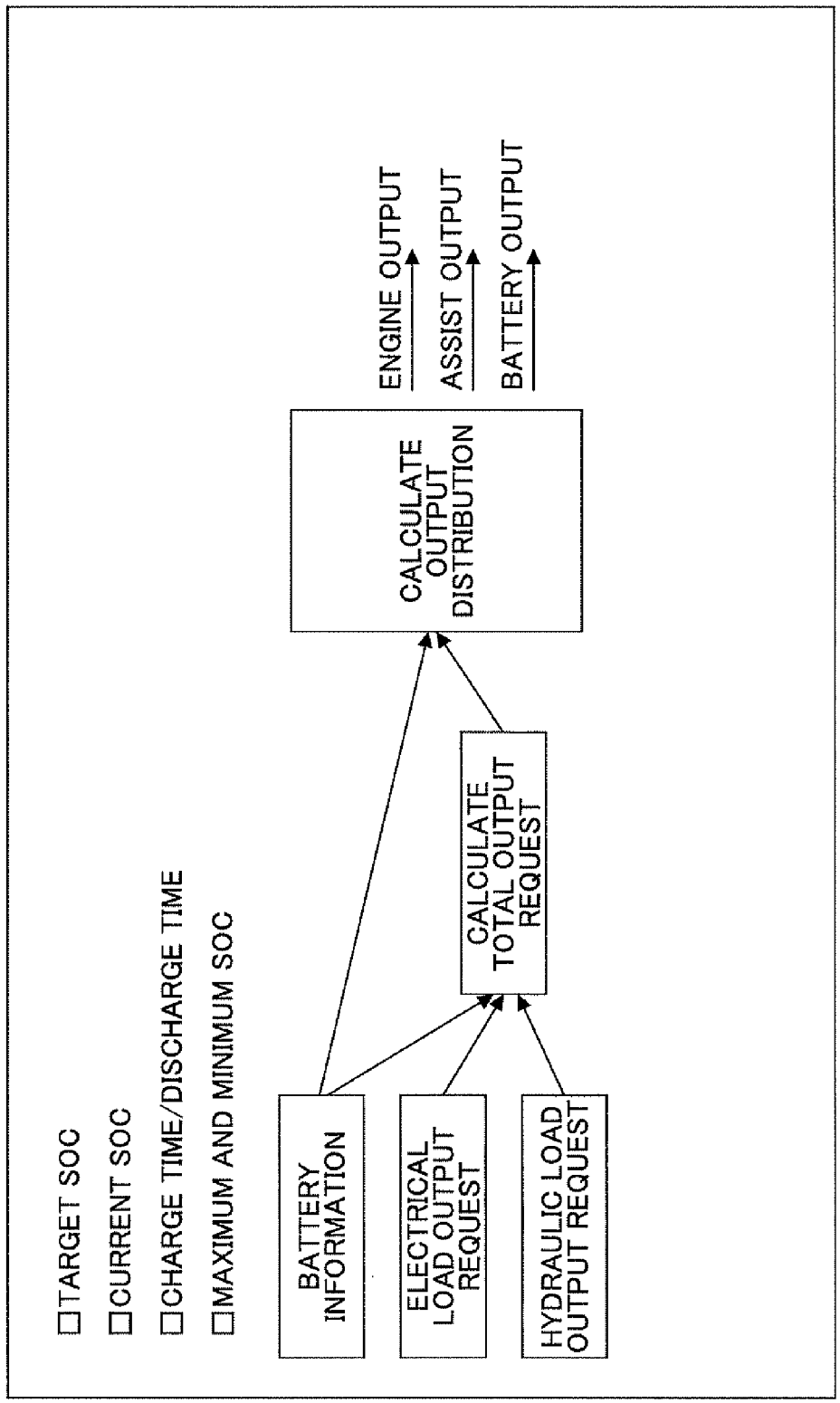
FIG. 10 is a diagram illustrating the concept of engine drive control according to the third embodiment.

Next, a description is given in detail of control in step S30 through step S31. FIG. 10 is a diagram illustrating the concept of drive control according to this embodiment.

First, as parameters used for the control, there are battery information, an electrical load output request, and a hydraulic load output request. The battery information, which is information representing the current condition of the battery 19, includes information such as a target state of charge (SOC), a current state of charge (SOC), a charge time/discharge time, and a maximum and a minimum state of charge (SOC). The electrical load output request is the electric power required by the electrical load 56, and is specifically electric power for causing the turning electric motor 21 to perform a power running operation according to this embodiment. The hydraulic load output request is the output required by the hydraulic load 54, and corresponds to power necessary to drive the main pump 14, which is a hydraulic pump.

First, assuming that the above-described hydraulic load output request and electrical load output request are all met by output from the engine 11, the power to be output by the engine 11 is determined. That is, the total output request is determined by totaling up the hydraulic load output request and the electrical load output request. The hydraulic load output request and the electrical load output request vary with time depending on the operating conditions of the construction machine.

Figure 11:
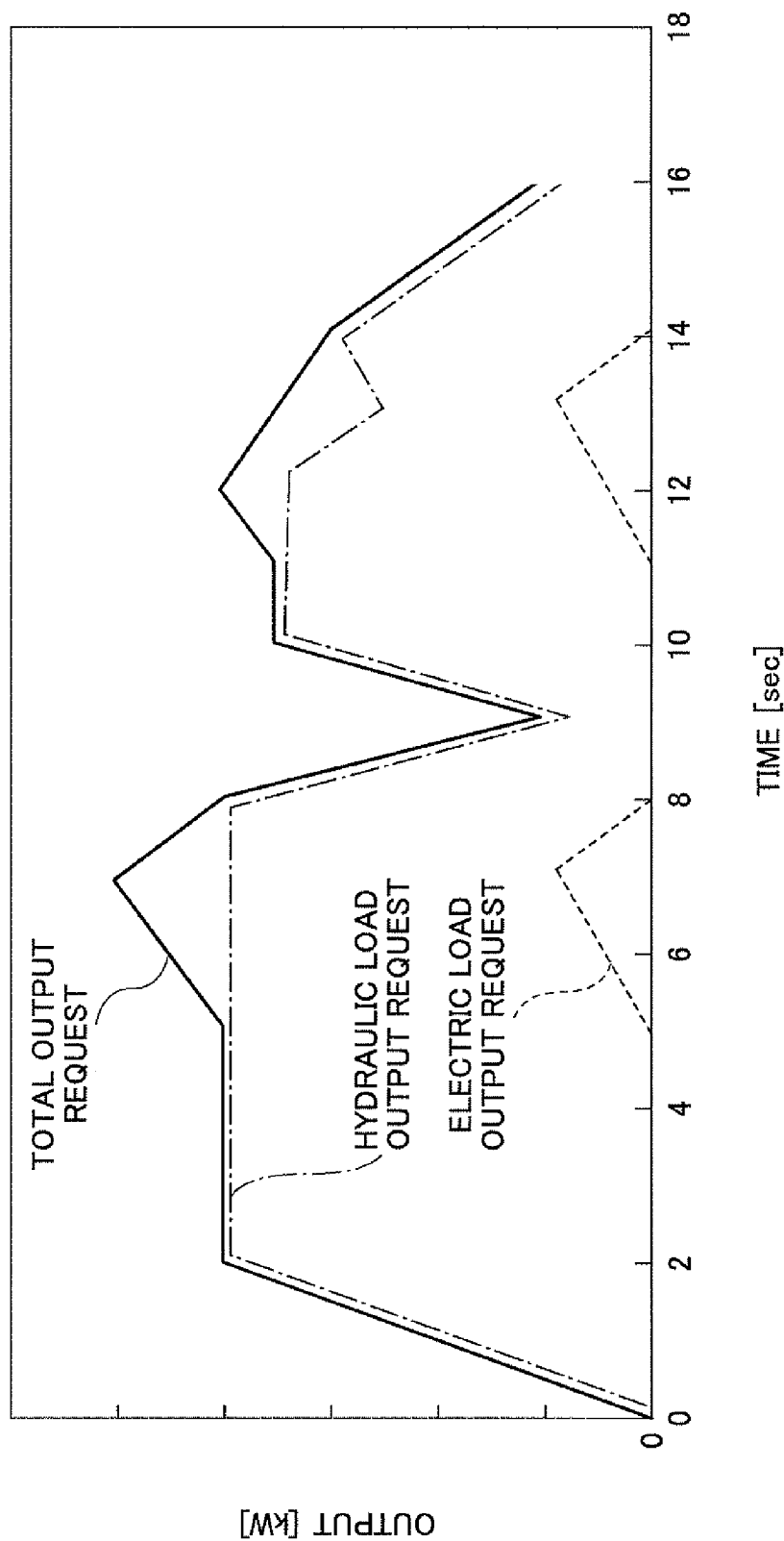
FIG. 11 is a graph illustrating temporal changes in a hydraulic load output request, an electrical load output request, and a total output request, which is their total.

FIG. 11 is a graph illustrating temporal changes in the hydraulic load output request, the electrical load output request, and the total output request, which is their total. In FIG. 11, the hydraulic load output request is indicated by a one-dot-chain line, and the electrical load output request is indicated by a dotted line. Further, the total output request, which is the total of the hydraulic load output request and the electrical load output request, is indicated by a solid line.

Here, it is assumed that the total output request is met by the output of the engine 11. A threshold for the total output request is preset, and if the total output request to be output by the engine 11 is less than or equal to this threshold, the total output request is met by the output of the battery 19 without using the output of the engine 11. That is, if the total output request is less than or equal to the threshold, the engine 11 is operated only to keep a constant number of revolutions. If the total output request is less than or equal to the threshold, the hydraulic load output request is met by causing the motor generator 12 to perform a power running operation to drive the hydraulic pump 14, and the electrical load output request is met by supplying electric power from the battery 19. If the total output request is less than or equal to the threshold, this is determined as a condition of a poor fuel consumption rate of the engine 11 due to the low power level to be output by the engine 11, so that the operation is intended to keep the number of revolutions and such control is performed that all the output required by the hydraulic load is met by the power running operation of the motor generator 12.

On the other hand, if the total output request to be output by the engine 11 is more than the threshold, it is determined that the output to be produced by the engine 11 is sufficiently large so that the engine 11 is operable under a condition of a good fuel consumption rate. Therefore, it is determined that all the total output request is to be met by output from the engine 11. Specifically, the hydraulic load output request is met by driving the hydraulic pump 14 with the output of the engine 11, and the electrical load request output is met by causing the motor generator 12 to perform a generator operation with the output of the engine 11.

Figure 12:
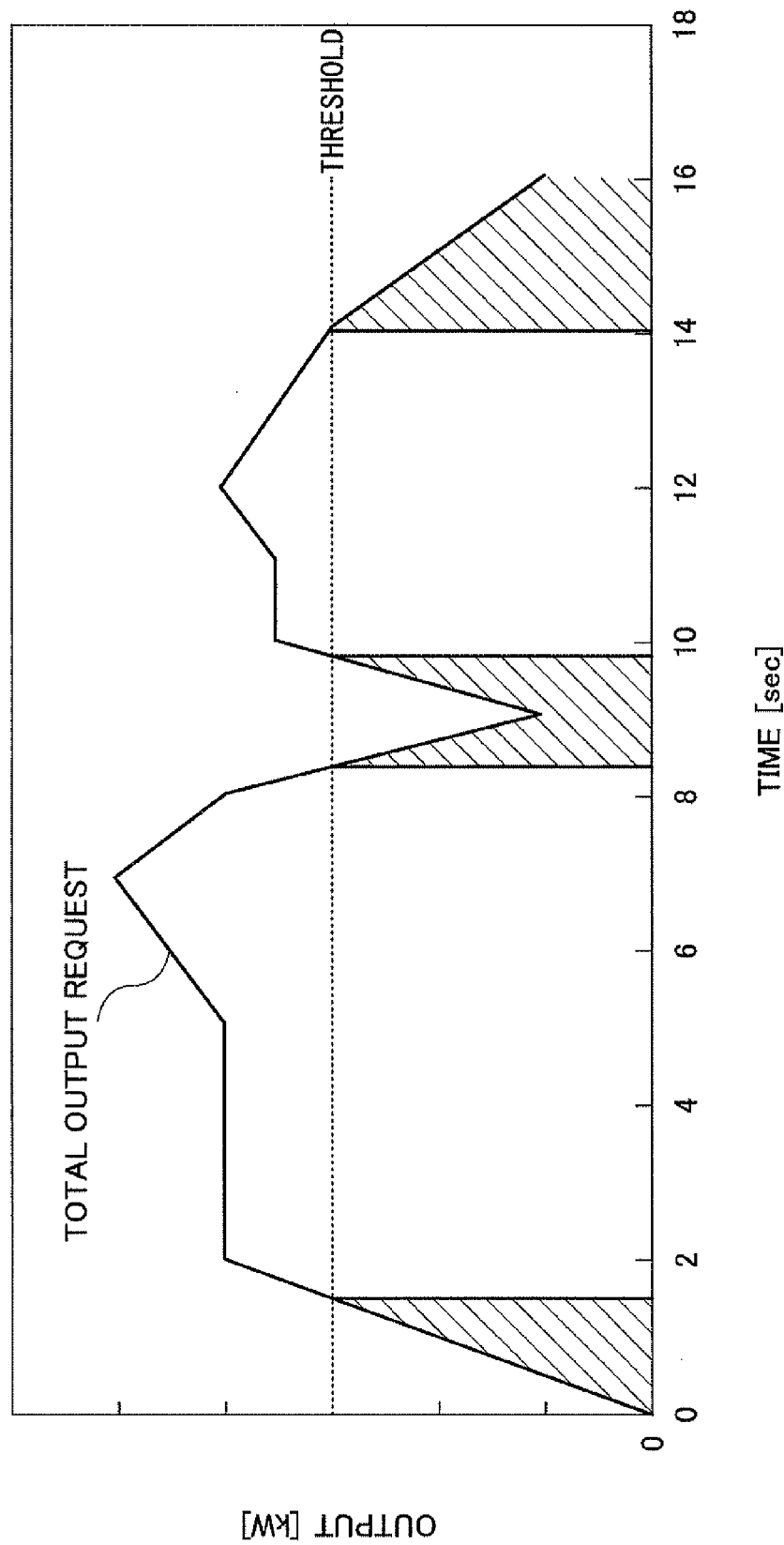
FIG. 12 is a graph where a threshold is written in the graph of the total output in FIG. 11.

FIG. 12 is a graph where the above-described threshold is written in the graph of the total output in FIG. 11. Portions where the total output request is less than or equal to the threshold are marked with oblique lines. In these portions of oblique lines, the total output request is met by electric power from the battery 19, and the total output request is met by the output of the engine 11 where the total output request is more than the threshold.

The charging of the battery 19 is not taken into account in the above-described control, while in the case of charging the battery 19, the battery 19 acts as an electrical load. Therefore, a description is given below of drive control that also takes the charging of the battery 19 into account.

First, it is assumed that a battery output request also is added to the hydraulic load output request and the electrical load output request in calculating the above-described total output request. The electrical load includes the turning electric motor 21 and the battery 19. Therefore, the electric power required by the turning electric motor 21 is referred to as "motor load output request," and the charging electric power required by the battery 19 is referred to as "battery output request."

Figure 13:
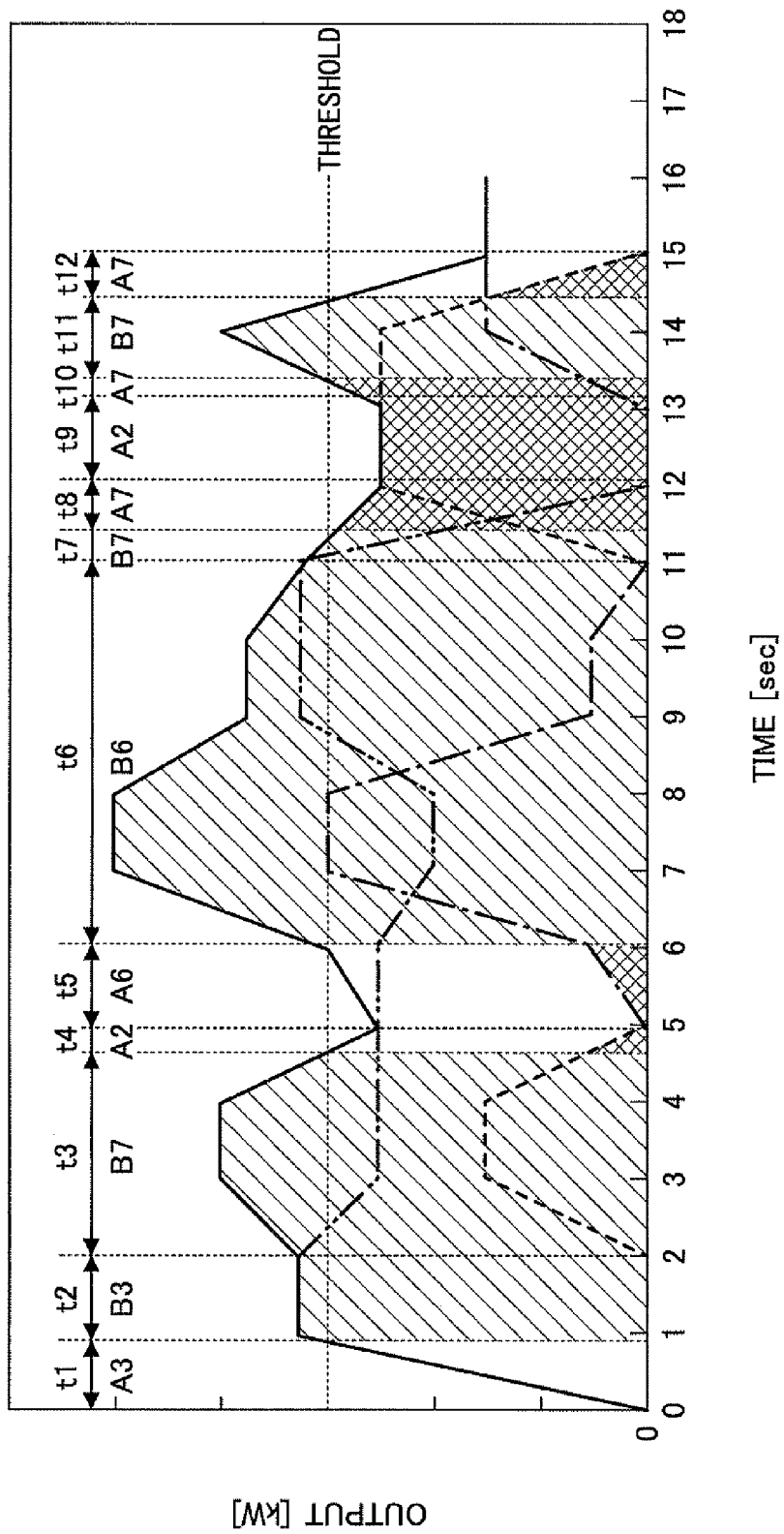
FIG. 13 is a graph illustrating temporal changes in the hydraulic load output request, a motor load output request, a battery output request, and the total output request, which is their total.

FIG. 13 is a graph illustrating temporal changes in the hydraulic load output request, the motor load output request, the battery output request, and the total output request, which is their total. Conditions change from moment to moment during the operation of the construction machine. Conditions A1 through A7 illustrated in FIG. 13 are of the case where the total output request is less than or equal to the threshold, and the total output request is more than the threshold in Conditions B1 through B7.

FIG. 14 is a table illustrating the statuses of the hydraulic load output request, the motor load output request, and the battery output request in Conditions A1 through A7 as well as the corresponding statuses of the output of the motor generator 12 (assist output), the output of the battery 19 (battery output), and the output of the engine 11. In FIG. 14, a circle represents the presence of an output request or the presence of output, and a cross represents the absence of an output request or the absence of output. Further, in the ASSIST OUTPUT row, ASSIST indicates that the motor generator 12 is being caused to perform a power running operation and assisting the engine 11, and IDLING indicates that the motor generator 12 is running idle, performing neither a power running operation nor a generator operation.

Likewise, FIG. 15 is a table illustrating the statuses of the hydraulic load output request, the motor load output request, and the battery output request in Conditions B1 through B7 as well as the corresponding statuses of the output of the motor generator 12 (assist output), the output of the battery 19 (battery output), and the output of the engine 11. In FIG. 15, a circle represents the presence of an output request or the presence of output, and a cross represents the absence of an output request or the absence of output. Further, in the ASSIST OUTPUT row, POWER GENERATION indicates that the motor generator 12 is being caused to perform a generator operation and generating electric power, and IDLING indicates that the motor generator 12 is running idle, performing neither a power running operation nor a generator operation.

For example, at time t1 illustrated in FIG. 13, the condition is A3, and the hydraulic load output request and the motor load output request are absent and only the battery output request is present as indicated in the Condition A3 column of FIG. 14. Accordingly, the total output request is equal to the battery output request. Further, at time t1, the total output request is less than or equal to the threshold. Therefore, the engine 11 is controlled to be operated while maintaining a constant number of revolutions without outputting power, and the motor generator 12 is controlled to run idle. Accordingly, although the battery output request is present, the battery 19 is not charged because of the stoppage of the output of the engine 11, and the battery output request is ignored.

At time t2 subsequent to time t1, the condition is B3, and the total output request composed only of the battery output request exceeds the threshold, so that the output of the engine 11 is allowed and the motor generator 12 is caused to perform a generator operation with the output of the engine 11 as illustrated in the Condition B3 column of FIG. 15. The electric power generated by the motor generator 12 is supplied to the battery 19 so that the battery 19 is charged.

Next, during time t3, the condition is B7, and the motor load output request is generated in addition to the battery output request as illustrated in the Condition B7 column of FIG. 15, so that the total output request, which is the total of the battery output request and the motor load output request, is above the threshold. Accordingly, the output of the engine 11 is allowed, and the motor generator 12 is caused to perform a generator operation with the output of the engine 11. The electric power generated by the motor generator 12 is supplied to the battery 19 and is also supplied to the turning electric motor 21 outputting the motor load output request.

Next, at time t4, the condition is A2, and the battery output request and the motor load output request are reduced, so that the total output request, which is the total of the battery output request and the motor load output request, is less than or equal to the threshold as illustrated in FIG. 13. Accordingly, as indicated in the Condition A2 column of FIG. 14, the engine 11 is controlled to only keep a constant number of revolutions and not output power, and the motor generator 12 also is controlled to run idle. Accordingly, although the battery output request is present, the battery 19 is not charged because of the stoppage of the output of the battery 11, and the battery output request is ignored. However, since the motor load output request is present, electric power is supplied from the battery 19 to the turning electric motor 21, which is an electrical load, and the turning electric motor 21 is caused to perform a power running operation as the turning electric motor 21 has requested.

Next, during time t5, the condition is A6, and the hydraulic load output request is generated so that the total output request becomes the total of the battery output request and the hydraulic load output request as illustrated in FIG. 13. However, at time t5, the total output request is less than or equal to the threshold. Therefore, as illustrated in the Condition A6 column of FIG. 14, the engine 11 is controlled to only keep a constant number of revolutions and not output power. However, since the hydraulic load output request is present, electric power is supplied from the battery 19 to the motor generator 12, so that the motor generator 12 is caused to perform a power running operation to drive the hydraulic motor 14. Accordingly, a hydraulic pressure is supplied from the hydraulic motor 14 to a hydraulic load. That is, the hydraulic motor 14 is driven by not the output of the engine 11 but the output (electric power) of the battery 19. In this case as well, although the battery output request is present, the battery 19 is not charged because of the stoppage of the output of the engine 11, and the battery output request is ignored.

Next, during time t6, the condition is B6, and the total output request is above the threshold because of an increase in the hydraulic load output request. Accordingly, the output of the engine 11 is allowed, and the hydraulic motor 14 is driven and the motor generator 12 is caused to perform a generator operation with the output of the engine 11. The electric power generated by the motor generator 12 is supplied to the battery 19, so that the battery 19 is charged.

In FIG. 13, the hatched portions are where the output request of a hydraulic load or an electrical load is met by output from the engine 11 or the battery is supplied with electric power. On the other hand, the cross-hatched portions are where the output request of a hydraulic load or an electrical load is met by the output of the battery 19.

In this embodiment, a description is given only of the case of the total output request being met by the output of the engine 11 only and the case of the total output request being met by the output of the motor generator 12 only, with one threshold provided. However, the output ratio of the engine 11 and the motor generator 12 may be gradually changed by providing multiple thresholds. In this case, if the total output request is small, the total output request is met by the output of the motor generator 12 only. Then, when the total output request gradually increases to reach a first threshold, the output of the engine 11 is added to the output of the motor generator 12. Thereafter, as the total output request increases, the ratio of the output of the engine 11 to the output of the motor generator 12 is caused to increase. When the output of the engine 11 becomes greater in ratio than the output of the motor generator 12 to result in a further increase in the total output request, the output from the motor generator 12 may be stopped and the total output request may be met by the output of the engine 11 only. Thus, the driving may be performed not only with the engine 11 or the motor generator 12 only but also by using one of them principally.

As described above, according to this embodiment, the output of the engine 11 is used only at a high load time when the fuel consumption rate is good while determining the operating conditions of a construction machine that change every moment with passage of time based on the presence or absence of a hydraulic load output request, a motor load output request, and a battery output request and on the comparison of a total output request, which is their total, with a threshold. This makes it possible to improve the fuel consumption rate of the engine 11 by controlling the driving of the engine 11, while maintaining the state of charge of the battery 19 in good order.

A description is given above of the hybrid work machines of illustrative embodiments of the present invention. The present invention, however, is not limited to the specifically disclosed embodiments, and variations and modifications may be made without departing from the scope of the claims.

The present application is based on and claims the benefit of priority of Japanese Patent Application No. 2008-169472, filed on Jun. 27, 2008, Japanese Patent Application No. 2008-230000, filed on Sep. 8, 2008, and Japanese Patent Application No. 2008-239851, filed on Sep. 18, 2008, the entire contents of which are incorporated herein by reference.

INDUSTRIAL APPLICABILITY

The present invention is applicable to hybrid construction machines where the driving of an engine is assisted by an electric motor.

DESCRIPTION OF THE REFERENCE NUMERALS 1 lower-part traveling body
1A, 1B traveling mechanism
2 turning mechanism
3 upper-part turning body
4 boom
5 arm
6 bucket
7 boom cylinder
8 arm cylinder
9 bucket cylinder
10 cabin
11 engine
12 motor generator
13 reduction machine
14 main pump
15 pilot pump
16 high-pressure hydraulic line
17 control valve
18 inverter
19 battery
20 inverter
21 turning electric motor
23 mechanical brake
24 turning reduction machine
25 pilot line
26 operation apparatus
26A, 26B lever
26C pedal
27 hydraulic line
28 hydraulic line
29 pressure sensor
30 controller
32 engine control unit
40 drive control unit
54 hydraulic load
56 electrical load

The invention claimed is:

1. A hybrid construction machine, comprising: an engine; a hydraulic pump configured to be driven by the engine; a hydraulic actuator configured to be driven with a hydraulic pressure from the hydraulic pump; an electric motor configured to assist driving of the engine; and a generator configured to be driven by the engine to generate a power, wherein a number of revolutions of the engine is caused to vary in accordance with a size of a load on the engine, the engine is decelerated by causing the generator to generate the power, in response to a decrease in the load requested of the engine, and the engine is accelerated by assisting the engine by driving the electric motor, in response to an increase in the load requested of the engine, wherein: one of the generator and the electric motor is driven until the number of revolutions of the engine reaches one of a predetermined low number of revolutions and a predetermined high number of revolutions, and an output of the one of the generator and the electric motor for the deceleration or the acceleration is stopped after the number of revolutions of the engine reaches the one of the predetermined low number of revolutions and the predetermined high number of revolutions.

2. The hybrid construction machine as claimed in claim 1, wherein it is determined that the load requested by the hydraulic pump is prevented from exceeding a maximum rated output of the engine.

3. The hybrid construction machine as claimed in claim 1, wherein it is determined that a total of an electrical load and a hydraulic load is prevented from exceeding a maximum rated output of the engine.

4. The hybrid construction machine as claimed in claim 1, wherein a reference torque line is determined based on a low fuel consumption region in an iso-fuel consumption map of the engine, and an operating condition of the engine is controlled so that the number of revolutions of the engine changes in correspondence to the reference torque line.

5. The hybrid construction machine as claimed in claim 4, wherein the reference torque line is so determined as to cause a fuel consumption rate to be a good value.

6. The hybrid construction machine as claimed in claim 1, wherein such a reference torque line as to cause a fuel consumption rate to be a predetermined good value is determined in an iso-fuel consumption map of the engine, and an operating condition of the engine is controlled so that the number of revolutions of the engine changes along the reference torque line.

7. The hybrid construction machine as claimed in claim 6, wherein the number of revolutions of the engine is variably controlled in response to a torque requested of the engine going outside a predetermined torque range having a center on the reference torque line.

8. The hybrid construction machine as claimed in claim 1, wherein a single motor generator is used for the electric motor and the generator.

9. The hybrid construction machine as claimed in claim 1, further comprising:
   a charge storage device configured to supply electric power to the electric motor and to supply the electric power to an electrical load,
   wherein the hydraulic pump is driven with an output of the electric motor as a primary power if a total output obtained by totaling an output to be supplied to the hydraulic actuator and an output to be supplied to the electrical load is less than or equal to a predetermined threshold, and
   the hydraulic pump is driven with an output of the engine as the primary power if the total output is more than the predetermined threshold.

10. The hybrid construction machine as claimed in claim 9, wherein the hydraulic pump is driven using only the output of the electric motor as power if the total output obtained by totaling the output to be supplied to the hydraulic actuator and the output to be supplied to the electrical load is less than or equal to the predetermined threshold.

11. The hybrid construction machine as claimed in claim 9, wherein the hydraulic pump is driven using only the output of the engine as power if the total output obtained by totaling the output to be supplied to the hydraulic actuator and the output to be supplied to the electrical load is more than the predetermined threshold.

12. The hybrid construction machine as claimed in claim 9, wherein the predetermined threshold is set based on a predetermined characteristic of the engine.

13. The hybrid construction machine as claimed in claim 12, wherein a characteristic expressed by a relationship between the number of revolutions of the engine and a torque of the engine is used as the predetermined characteristic.

14. The hybrid construction machine as claimed in claim 9, wherein the charge storage device is configured to supply the electric power to the electrical load if the total output is composed only of the output to be supplied to the electrical load and is less than or equal to the predetermined threshold.

15. The hybrid construction machine as claimed in claim 9, wherein the charge storage device is configured to supply the electric power to the electric motor so that the hydraulic pump is driven only with the output of the electric motor if the total output is composed only of the output to be supplied to the hydraulic actuator and is less than or equal to the predetermined threshold.

* * * * *